US011841053B1

(12) United States Patent
Furuhashi et al.

(10) Patent No.: US 11,841,053 B1
(45) Date of Patent: Dec. 12, 2023

(54) CLUTCH DEVICE

(71) Applicant: Kabushiki Kaisha F.C.C., Hamamatsu (JP)

(72) Inventors: Shinji Furuhashi, Hamamatsu (JP); Jun Komukai, Hamamatsu (JP); Makoto Kambara, Hamamatsu (JP); Satoshi Ota, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/217,679

(22) Filed: Jul. 3, 2023

(30) Foreign Application Priority Data

Jul. 5, 2022 (JP) .................................. 2022-108659
May 22, 2023 (JP) .................................. 2023-083872

(51) Int. Cl.
*F16D 13/52* (2006.01)
*F16D 23/12* (2006.01)
*F16D 13/74* (2006.01)
*F16D 13/70* (2006.01)

(52) U.S. Cl.
CPC ............. *F16D 23/12* (2013.01); *F16D 13/52* (2013.01); *F16D 13/70* (2013.01); *F16D 13/74* (2013.01); *F16D 2023/123* (2013.01)

(58) Field of Classification Search
CPC .......... F16D 13/56; F16D 13/74; F16D 13/70; F16D 13/52; F16D 23/12; F16D 2023/123
See application file for complete search history.

(56) References Cited

U.S. PATENT DOCUMENTS

| 2008/0308382 | A1* | 12/2008 | Kataoka | ................. | F16D 13/56 |
| | | | | | 192/93 R |
| 2015/0041275 | A1 | 2/2015 | Satou et al. | | |
| 2019/0017554 | A1* | 1/2019 | Isobe | .................... | F16D 13/56 |
| 2021/0164524 | A1* | 6/2021 | Kitazawa | ............. | F16D 13/752 |

FOREIGN PATENT DOCUMENTS

| EP | 4 194 710 A1 | | 6/2023 |
| JP | 5847551 B2 | | 1/2016 |
| JP | 2022072810 A | * | 5/2022 |
| WO | 2018/172176 A1 | | 9/2018 |
| WO | 2022/030350 A1 | | 2/2022 |

* cited by examiner

*Primary Examiner* — Lori Wu
(74) *Attorney, Agent, or Firm* — Keating & Bennett, LLP

(57) ABSTRACT

Pressure-side cam portions of a pressure plate each include a pressure-side assist cam portion including a pressure-side assist cam surface, a pressure-side body located between the pressure-side assist cam portion and a pressure-side slipper cam portion, and a first stepped portion between a main outer circumferential surface of the pressure-side body and a sub outer circumferential surface of the pressure-side assist cam portion. The sub outer circumferential surface is located radially inward of the main outer circumferential surface. The sub outer circumferential surface is inclined radially inward in a second direction. Among portions of the main outer circumferential surface, at least a stepped portion-side outer circumferential surface adjacent to the first stepped portion is inclined radially outward in the second direction.

3 Claims, 17 Drawing Sheets

CLUTCH DEVICE

CROSS REFERENCE TO RELATED APPLICATIONS

This application claims the benefit of priority to Japanese Patent Application No. 2022-108659 filed on Jul. 5, 2022 and Japanese Patent Application No. 2023-083872 filed on May 22, 2023. The entire contents of these applications are hereby incorporated herein by reference.

BACKGROUND OF THE INVENTION

1. Field of the Invention

The present disclosure relates to a clutch device, and more particularly, to a clutch device that allows or blocks, as needed, transfer of a rotation driving force of an input shaft, rotationally drivable by a prime mover such as an engine or the like, to an output shaft.

2. Description of the Related Art

Conventional vehicles such as motorcycles or the like include clutch devices. A clutch device is located between an engine and a drive wheel, and allows or blocks transfer of a rotation driving force of the engine to the drive wheel. The clutch device generally includes a plurality of input-side rotating plates rotatable by a rotation driving force of the engine and a plurality of output-side rotating plates connected with an output shaft that transfers the rotation driving force to the drive wheel. The input-side rotating plates and the output-side rotating plates are alternately arranged in a stacking direction, and the input-side rotating plates and the output-side rotating plates are brought into pressure contact with each other or are separated from each other so that transfer of a rotation driving force is allowed or blocked.

Japanese Patent No. 5847551 and WO2018/172176, for example, each disclose a clutch device including a clutch center and a pressure plate movable toward or away from the clutch center. The pressure plate is configured to be capable of pressing the input-side rotating plates and the output-side rotating plates. In this manner, the clutch device includes an assembly of the clutch center and the pressure plate.

In the clutch device of each of Japanese Patent No. 5847551 and WO2018/172176, the clutch center and the pressure plate each include an assist cam surface and a slipper cam surface. In a state where the rotation driving force of the engine may be transferred to the output shaft, the assist cam surface generates a force in such a direction as to cause the pressure plate to approach the clutch center and thus increases the pressing force between the input-side rotating plates and the output-side rotating plates. When the rotation speed of the clutch center exceeds the rotation speed of the pressure plate, the slitter cam surface separates the pressure plate away from the clutch center and thus decreases the pressing force between the input-side rotating plates and the output-side rotating plates.

In the clutch device as described above, the assist cam surface of the pressure plate and the assist cam surface of the clutch center frequency contact each other, and the slipper cam surface of the pressure plate and the slipper cam surface of the clutch center frequency contact each other. Therefore, in order to suppress abrasion of the assist cam surfaces and the slipper cam surfaces and generation of noise at the time of contact, it is desired to effectively supply clutch oil to the assist cam surfaces and the slipper cam surfaces.

SUMMARY OF THE INVENTION

Preferred embodiments of the present invention provide a clutch device capable of effectively supplying clutch oil to the assist cam surfaces and the slipper cam surfaces.

A clutch device according to the present disclosure is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, and a pressure plate movable toward or away from the clutch center and rotatable with respect to the clutch center, the pressure plate holding at least a portion of a plurality of output-side rotating plates alternately arranged with the input-side rotating plates, the pressure plate being capable of pressing the input-side rotating plates and the output-side rotating plates. The pressure plate includes a plurality of pressure-side cam portions each including a pressure-side assist cam surface to generate a force in such a direction as to cause the pressure plate to approach the clutch center, in order to increase a pressing force between the input-side rotating plates and the output-side rotating plates, when the pressure plate rotates with respect to the clutch center. The pressure-side cam portions each include a pressure-side assist cam portion including the pressure-side assist cam surface, a pressure-side body adjacent to the pressure-side assist cam portion and located ahead of the pressure-side assist cam portion in a direction opposite to a rotation direction of the pressure plate, and a stepped portion between a main outer circumferential surface of the pressure-side body and a sub outer circumferential surface of the pressure-side assist cam portion and extending in an axial direction of the output shaft. The sub outer circumferential surface is located radially inward of the main outer circumferential surface. Where a direction in which the pressure plate approaches the clutch center is defined as a first direction and a direction in which the pressure plate separates away from the clutch center is defined as a second direction, the sub outer circumferential surface is inclined radially inward in the second direction. Among portions of the main outer circumferential surface, at least a stepped portion-side outer circumferential surface adjacent to the stepped portion is inclined radially outward in the second direction.

In a clutch device according to a preferred embodiment of the present disclosure, the pressure-side cam portions each include a stepped portion between the main outer circumferential surface of the pressure-side body and the sub outer circumferential surface of the pressure-side assist cam portion and extending in the axial direction of the output shaft. The sub outer circumferential surface is located radially inward of the main outer circumferential surface. Among portions of the main outer circumferential surface, at least the stepped portion-side outer circumferential surface adjacent to the stepped portion is inclined radially outward in the second direction. The pressure plate is rotatable in the direction from the pressure-side body toward the pressure-side assist cam portion. Therefore, the clutch oil flowing on the sub outer circumferential surface in the direction opposite to the above-mentioned direction is stopped by the stepped portion and thus accumulates on the sub outer circumferential surface. The pressure-side assist cam portion including the sub outer circumferential surface includes the pressure-side assist cam surface. Therefore, the clutch oil accumulated on the sub outer circumferential surface is supplied to the pressure-side assist cam surface. The sub outer circumferential surface and the stepped portion-side outer circumferential surface are inclined in opposite directions to each other with respect to the axial direction of the output shaft. Therefore, the height of the stepped portion is made higher, and thus the amount of the clutch oil accumulated on the sub outer circumferential surface, that is, the amount of the clutch oil supplied to the pressure-side assist cam surface is increased. In this manner, the clutch oil is effectively supplied to the pressure-side assist cam surface, and the clutch oil is also effectively supplied to the center-side assist cam surface through the pressure-side assist cam surface.

Another clutch device according to a preferred embodiment of the present disclosure is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, and a pressure plate movable toward or away from the clutch center and rotatable with respect to the clutch center, the pressure plate holding at least a portion of a plurality of output-side rotating plates alternately arranged with the input-side rotating plates, the pressure plate being capable of pressing the input-side rotating plates and the output-side rotating plates. The pressure plate includes a cylindrical portion housing a distal end of the output shaft and receiving clutch oil flowing out of the output shaft, a plurality of pressure-side cam portions located radially outward of the cylindrical portion, the pressure-side cam portions each including a pressure-side assist cam surface to generate a force in such a direction as to cause the pressure plate to approach the clutch center, in order to increase a pressing force between the input-side rotating plates and the output-side rotating plates, when the pressure plate rotates with respect to the clutch center, and also including a pressure-side slipper cam surface separating the pressure plate from the clutch center, to decrease the pressing force between the input-side rotating plates and the output-side rotating plates, when the pressure plate rotates with respect to the clutch center, and a pressure-side cam hole located radially outward of the cylindrical portion and between adjacent ones of the pressure-side cam portions while penetrating the pressure plate. The pressure-side cam portions each include a pressure-side assist cam portion including the pressure-side assist cam surface, a pressure-side slipper cam portion including the pressure-side slipper cam surface, and a pressure-side body located between the pressure-side assist cam portion and the pressure-side slipper cam portion. The cylindrical portion includes a cam hole-side outer circumferential surface located at an inner circumferential surface of the pressure-side cam hole, and a cam portion-side outer circumferential surface located radially outward of the cam hole-side outer circumferential surface and adjacent to the pressure-side slipper cam portion. The pressure plate further includes a stepped portion between the cam hole-side outer circumferential surface and the cam portion-side outer circumferential surface and extending in an axial direction of the output shaft. The pressure plate is rotatable in a direction from the pressure-side body toward the pressure-side assist cam portion. Where a direction in which the pressure plate approaches the clutch center is defined as a first direction and a direction in which the pressure plate separates away from the clutch center is defined as a second direction, the cam hole-side outer circumferential surface is inclined radially inward in the second direction, and the cam portion-side outer circumferential surface is inclined radially outward in the second direction.

In another clutch device according to a preferred embodiment of the present disclosure, the pressure plate includes a stepped portion between the cam hole-side outer circumferential surface and the cam portion-side outer circumferential surface of the cylindrical portion and extending in the axial direction of the output shaft. The cam portion-side outer circumferential surface is located radially outward of the cam hole-side outer circumferential surface. The cam hole-side outer circumferential surface is inclined radially inward in the second direction, and the cam portion-side outer circumferential surface is inclined radially outward in the second direction. The pressure plate is rotatable in the direction from the pressure-side body toward the pressure-side assist cam portion. Therefore, the clutch oil flowing on the outer circumferential surface of the cylindrical portion, for example, flows along the stepped portion and thus flows in the direction opposite to the above-mentioned direction to the pressure-side assist cam portion. The cam hole-side outer circumferential surface and the cam portion-side outer circumferential surface are inclined in opposite directions to each other with respect to the axial direction of the output shaft. Therefore, the height of the stepped portion is made higher, and thus the amount of the clutch oil accumulated on the outer circumferential surface of the cylindrical portion, that is, the amount of the clutch oil supplied to the pressure-side assist cam surface is increased. In this manner, the clutch oil is effectively supplied to the pressure-side assist cam surface, and the clutch oil is also effectively supplied to the center-side assist cam surface through the pressure-side assist cam surface.

Still another clutch device according to a preferred embodiment of the present disclosure is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, and a pressure plate movable toward or away from the clutch center and rotatable with respect to the clutch center, the pressure plate holding at least a portion of a plurality of output-side rotating plates alternately arranged with the input-side rotating plates, the pressure plate being capable of pressing the input-side rotating plates and the output-side rotating plates. The pressure plate includes a plurality of pressure-side cam portions each including a pressure-side assist cam surface generating a force in such a direction as to cause the pressure plate to approach the clutch center, to increase a pressing force between the input-side rotating plates and the output-side rotating plates, when the pressure plate rotates with respect to the clutch center. The clutch center includes an output shaft holding portion coupled with the output shaft, and a plurality of center-side cam portions located radially outward of the output shaft holding portion, the plurality of center-side cam portions each including a center-side assist cam surface contactable with the pressure-side assist cam surface and generating a force in such a direction as to cause the pressure plate to approach the clutch center, to increase a pressing force between the input-side rotating plates and the output-side rotating plates, when the clutch center rotates with respect to the pressure plate. The center-side cam portions each include a center-side assist cam portion including the center-side assist cam surface, a center-side body adjacent to the center-side assist cam portion and located ahead of the center-side assist cam portion in a rotation direction of the clutch center, and a stepped portion between a main inner circumferential surface of the center-side body and a sub inner circumferential surface of the center-side assist cam portion and extending in an axial direction of the output shaft. Where a direction in which the pressure plate approaches the clutch center is defined as a first direction and a direction in which the pressure plate separates away from the clutch center is defined as a second direction, the sub inner circumferential surface is located radially outward of the main inner circumferential surface, and is inclined radially outward in the first direction. Among portions of the main inner circumferential surface, at least a stepped portion-side inner circumferential surface adjacent to the stepped portion is inclined radially inward in the first direction.

In still another clutch device according to a preferred embodiment of the present disclosure, the center-side cam portions each include a stepped portion between the main inner circumferential surface of the center-side body and the sub inner circumferential surface of center-side assist cam portion and extending in the axial direction of the output shaft. The sub inner circumferential surface is located radially outward of the main inner circumferential surface, and is inclined radially outward in the first direction. Among portions of the main inner circumferential surface, at least the stepped portion-side inner circumferential surface adjacent to the stepped portion is inclined radially inward in the first direction. The clutch center is rotatable in the direction from the center-side assist cam portion toward the center-side body. Therefore, the clutch oil flowing on the main inner circumferential surface, for example, flows along the stepped portion, and thus flows to the sub inner circumferential surface. The center-side assist cam portion including the sub inner circumferential surface includes the center-side assist cam surface. Therefore, the clutch oil flowing on the sub inner circumferential surface is supplied to the center-side assist cam surface. The sub inner circumferential surface and the stepped portion-side inner circumferential surface are inclined in opposite directions to each other with respect to the axial direction of the output shaft. Therefore, the height of the stepped portion is made higher, and thus the amount of the clutch oil accumulated on the sub inner circumferential surface, that is, the amount of the clutch oil supplied to the center-side assist cam surface is increased. In this manner, the clutch oil is effectively supplied to the center-side assist cam surface, and the clutch oil is also effectively supplied to the pressure-side assist cam surface through the center-side assist cam surface.

Still another clutch device according to a preferred embodiment of the present disclosure is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, and a pressure plate movable toward or away from the clutch center and rotatable with respect to the clutch center, the pressure plate holding at least a portion of a plurality of output-side rotating plates alternately arranged with the input-side rotating plates, the pressure plate being capable of pressing the input-side rotating plates and the output-side rotating plates. The clutch center includes an output shaft holding portion coupled with the output shaft, and a plurality of center-side cam portions located radially outward of the output shaft holding portion, the plurality of center-side cam portions each including a center-side assist cam surface to generate a force in such a direction as to cause the pressure plate to approach the clutch center, in order to increase a pressing force between the input-side rotating plates and the output-side rotating plates, when the clutch center rotates with respect to the pressure plate. The center-side cam portions each include a center-side assist cam portion including the center-side assist cam surface, a center-side body adjacent to the center-side assist cam portion and located ahead of the center-side assist cam portion in a rotation direction of the clutch center, and a stepped portion between a main outer circumferential surface of the center-side body and a sub outer circumferential surface of the center-side assist cam portion and extending in an axial direction of the output shaft. The sub outer circumferential surface is located radially inward of the main outer circumferential surface. Where a direction in which the pressure plate approaches the clutch center is defined as a first direction and a direction in which the pressure plate separates away from the clutch center is defined as a second direction, the sub outer circumferential surface is inclined radially inward in the first direction. Among portions of the main outer circumferential surface, at least a stepped portion-side outer circumferential surface adjacent to the stepped portion is inclined radially outward in the first direction.

In still another clutch device according to a preferred embodiment of the present disclosure, the center-side cam portions each include a stepped portion between the main outer circumferential surface of the center-side body and the sub outer circumferential surface of center-side assist cam portion and extending in the axial direction of the output shaft. The sub outer circumferential surface is located radially inward of the main outer circumferential surface. Among portions of the main outer circumferential surface, at least the stepped portion-side outer circumferential surface adjacent to the stepped portion is inclined radially outward in the first direction. The clutch center is rotatable in the direction from the center-side assist cam portion toward the center-side body. Therefore, the clutch oil flowing on the main outer circumferential surface, for example, flows along the stepped portion, and thus flows to the sub outer circumferential surface. The center-side assist cam portion including the sub outer circumferential surface includes the center-side assist cam surface. Therefore, the clutch oil flowing on the sub outer circumferential surface is supplied to the center-side assist cam surface. The sub outer circumferential surface and the stepped portion-side outer circumferential surface are inclined in opposite directions to each other with respect to the axial direction of the output shaft. Therefore, the height of the stepped portion is made higher, and thus the amount of the clutch oil accumulated on the sub outer circumferential surface, that is, the amount of the clutch oil supplied to the center-side assist cam surface is increased. In this manner, the clutch oil is effectively supplied to the center-side assist cam surface, and the clutch oil is also effectively supplied to the pressure-side assist cam surface through the center-side assist cam surface.

The present disclosure can provide a clutch device capable of effectively supplying clutch oil to an assist cam surface and a slipper cam surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
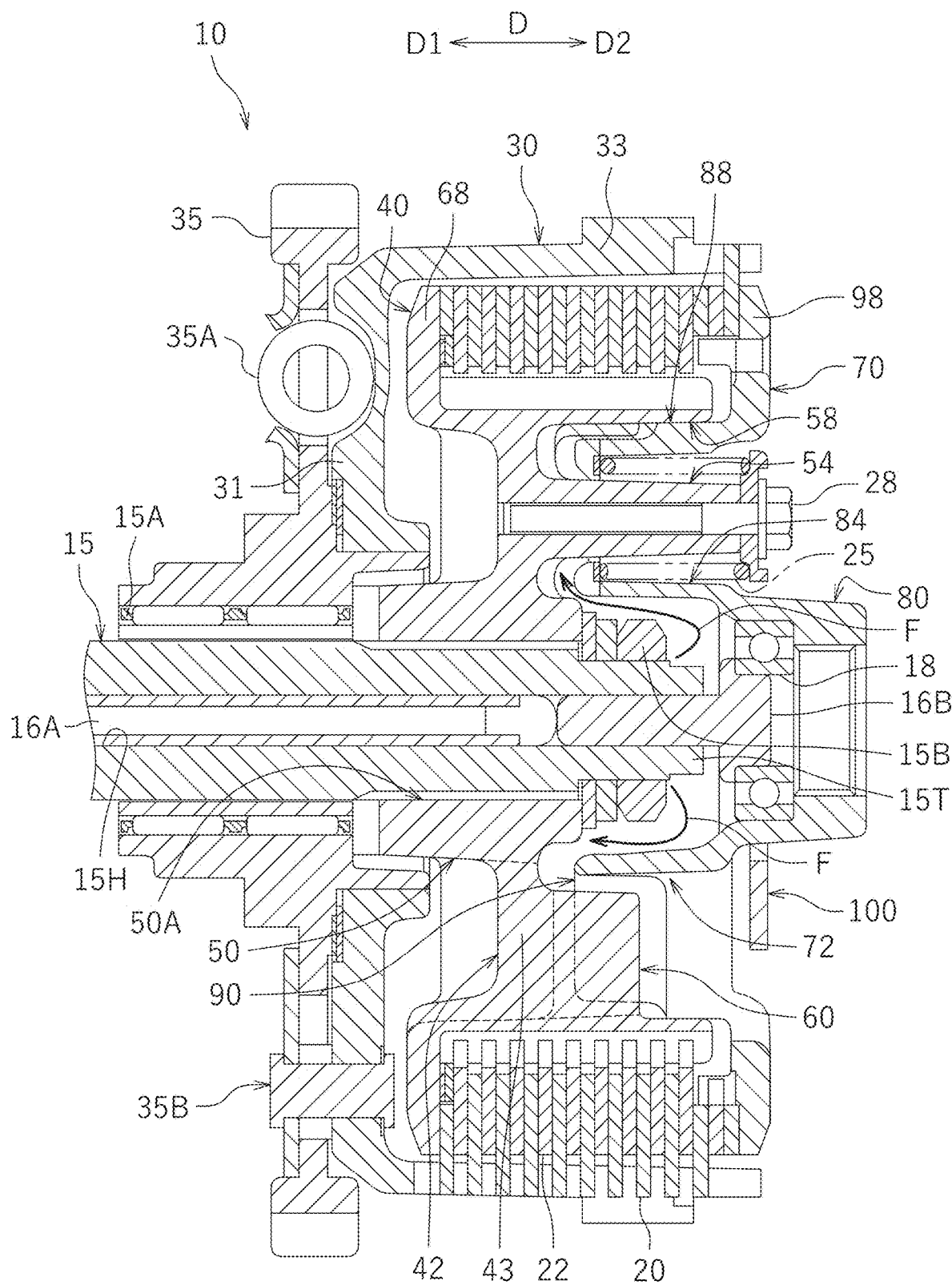
FIG. 1 is a cross-sectional view of a clutch device according to a preferred embodiment of the present invention.

Preferred embodiments of clutch devices according to the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle or the like, for example. The clutch device 10 allows or blocks transfer of a rotation driving force of an input shaft (crankshaft) of an engine of the motorcycle to an output shaft 15, for example. The clutch device 10 allows or blocks transfer of a rotation driving force of the input shaft to a drive wheel (rear wheel) through the output shaft 15. The clutch device 10 is located between the engine and a transmission.

In the following description, a direction in which a pressure plate 70 and the clutch center 40 of the clutch device 10 are aligned will be referred to as a direction D, a direction in which the pressure plate 70 moves toward the clutch center 40 will be referred to as a first direction D1, and a direction in which the pressure plate 70 moves away from the clutch center 40 will be referred to as a second direction D2. A circumferential direction of the clutch center 40 and the pressure plate 70 will be referred to as a circumferential direction S. Regarding two of pressure-side cam portions 90 located along the circumferential direction S, a circumferential direction from one pressure-side cam portion 90 to the other pressure-side cam portion 90 will be referred to as a first circumferential direction S1 (see FIG. 5), and a circumferential direction from the other pressure-side cam portion 90 to the one pressure-side cam portion 90 will be referred to as a second circumferential direction S2 (see FIG. 5). In this preferred embodiment, an axial direction of the output shaft 15, an axial direction of a clutch housing 30, an axial direction of the clutch center 40, and an axial direction of the pressure plate 70 are the same as the direction D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described below and the clutch housing 30 through a needle bearing 15A. The output shaft 15 securely supports the clutch center 40 through a nut 15B. That is, the output shaft 15 rotates together with the clutch center 40. The other end of the output shaft 15 is coupled with a transmission (not shown) of a motorcycle, for example.

As illustrated in FIG. 1, the output shaft 15 includes, in a hollow portion 15H thereof, a push rod 16A and a push member 16B adjacent to the push rod 16A. The hollow portion 15H serves as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in FIG. 1) coupled with a clutch operation lever (not shown) of the motorcycle, and slides in the hollow portion 15H by an operation made on the clutch operation lever and presses the push member 16B in the second direction D2. A portion of the push member 16B projects outward of the output shaft 15 (in the second direction D2 in this preferred embodiment) and is coupled with a release bearing 18 provided in the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending in the second direction D2 from an edge of the bottom wall 31. The clutch housing 30 holds the plurality of input-side rotating plates 20.

As illustrated in FIG. 1, the input gear 35 is located on the bottom wall 31 of the clutch housing 30. The input gear 35 is secured to the bottom wall 31 by a rivet 35B through a torque damper 35A. The input gear 35 meshes with a driving gear (not shown) that rotates by rotational driving of the input shaft of the engine. The input gear 35 is rotationally drivable together with the clutch housing 30, independently of the output shaft 15.

The input-side rotating plates 20 are rotationally drivable by rotational driving of the input shaft. As illustrated in FIG. 1, the input-side rotating plates 20 are held on an inner circumferential surface of the side wall 33 of the clutch housing 30. The input-side rotating plates 20 are held by the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is molded by punching a thin plate of a steel plate cold commercial (SPCC) material into a ring shape. Friction members (not shown) of a plurality of paper sheets are attached to front and back surfaces of each of the input-side rotating plates 20. A groove with a depth of several micrometers to several tens of micrometers is located between the friction members to hold clutch oil.

As illustrated in FIG. 1, the clutch center 40 is housed in the clutch housing 30. The clutch center 40 and the clutch housing 30 are concentrically located. The clutch center 40 includes a cylindrical body 42 and a flange 68 extending radially outward from an outer circumferential edge of the body 42. The clutch center 40 holds the plurality of output-side rotating plates 22 arranged alternately with the input-side rotating plates 20 in the direction D. The clutch center 40 is rotationally drivable together with the output shaft 15.

Figure 2:
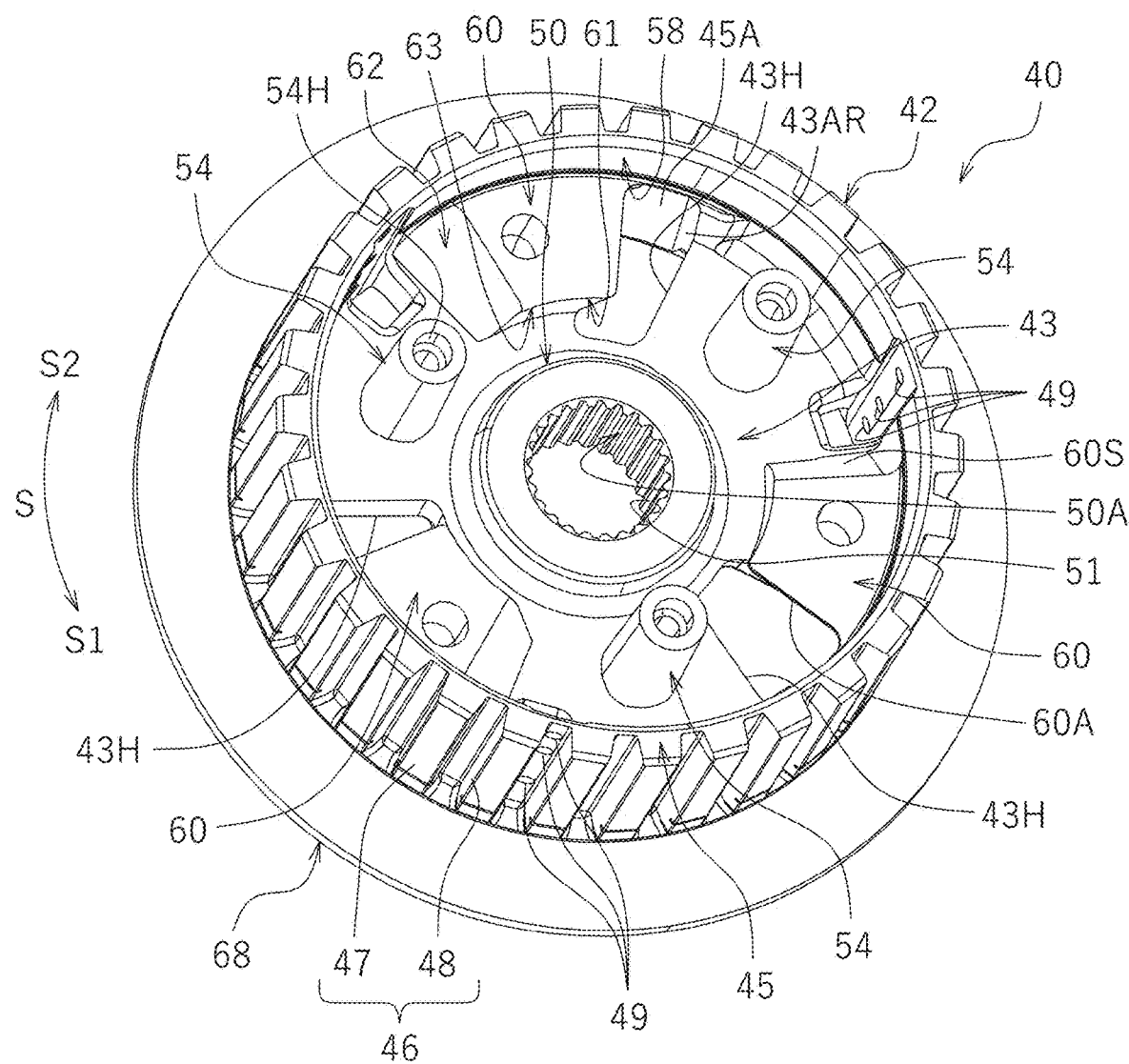
FIG. 2 is a perspective view of a clutch center according to a preferred embodiment of the present invention.

As illustrated in FIG. 2, the body 42 includes a ring-shaped base wall 43, an outer circumferential wall 45 located radially outward of the base wall 43 and extending in the second direction D2, an output shaft holding portion 50 located at the center of the base wall 43, a plurality of center-side cam portions 60 connected with the base wall 43 and the outer circumferential wall 45, and a center-side fitting portion 58.

The output shaft holding portion 50 has a cylindrical shape. The output shaft holding portion 50 has an insertion hole 51, in which the output shaft 15 is inserted and spline-fitted. The insertion hole 51 penetrates the base wall 43. An inner circumferential surface 50A, of the output shaft holding portion 50, defining the insertion hole 51 has a plurality of spline grooves positioned along an axial direction thereof. The output shaft 15 is coupled with the output shaft holding portion 50.

As illustrated in FIG. 2, the outer circumferential wall 45 of the clutch center 40 is located radially outward of the output shaft holding portion 50. An outer circumferential surface of the outer circumferential wall 45 has a spline fitting portion 46. The spline fitting portion 46 includes a plurality of center-side fitting teeth 47 extending in the axial direction of the clutch center 40 along the outer circumferential surface of the outer circumferential wall 45, a plurality of spline grooves 48 each provided between adjacent ones of the center-side fitting teeth 47 and extending in the axial direction of the clutch center 40, and oil flow holes 49. The center-side fitting teeth 47 hold the output-side rotating plates 22. The plurality of center-side fitting teeth 47 are arranged in the circumferential direction S. The plurality of center-side fitting teeth 47 are arranged at an equal interval in the circumferential direction S. The plurality of center-side fitting teeth 47 have the same shape. The center-side fitting teeth 47 project radially outward from the outer circumferential surface of the outer circumferential wall 45. The oil flow holes 49 penetrate the outer circumferential wall 45 in the radial direction. The oil flow holes 49 are located between adjacent ones of the center-side fitting teeth 47. That is, the oil flow holes 49 are located in the spline grooves 48. The oil flow holes 49 are located to the side of the center-side cam portions 60. The oil flow holes 49 are located to the side of center-side slipper cam surfaces 60S of the center-side cam portions 60. The oil flow holes 49 are located ahead of the center-side slipper cam surfaces 60S in the first circumferential direction S1. The oil flow holes 49 are located ahead of bosses 54 described below in the second circumferential direction S2. In this preferred embodiment, three oil flow holes 49 are located at each of three positions in the circumferential direction S of the outer circumferential wall 45. The oil flow holes 49 are located at an equal interval in the circumferential direction S. The oil flow holes 49 cause the inside and the outside of the clutch center 40 to communicate with each other. The oil flow holes 49 allow clutch oil, flowing out from the output shaft 15 into the clutch center 40, to flow to the outside of the clutch center 40.

The output-side rotating plates 22 are held by the spline fitting portion 46 of the clutch center 40 and the pressure plate 70. A portion of the output-side rotating plates 22 is held by the center-side fitting teeth 47 and the spline grooves 48 of the clutch center 40 by spline fitting. Another portion of the output-side rotating plates 22 is held by pressure-side fitting teeth 77 (see FIG. 4; described below) of the pressure plate 70. The output-side rotating plates 22 are displaceable along the axial direction of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is molded by punching a thin plate of an SPCC material into a ring shape. Front and back surfaces of each of the output-side rotating plates 22 have grooves with depths of several micrometers to several tens of micrometers to hold clutch oil. The front and back surfaces of each of the output-side rotating plates 22 are subjected to a surface hardening treatment to enhance abrasion resistance thereof. The friction members, described above as being provided on the input-side rotating plates 20, may be provided on the output-side rotating plates 22 instead of on the input-side rotating plates 20, or may be provided on both the input-side rotating plates 20 and the output-side rotating plates 22.

Figure 3:
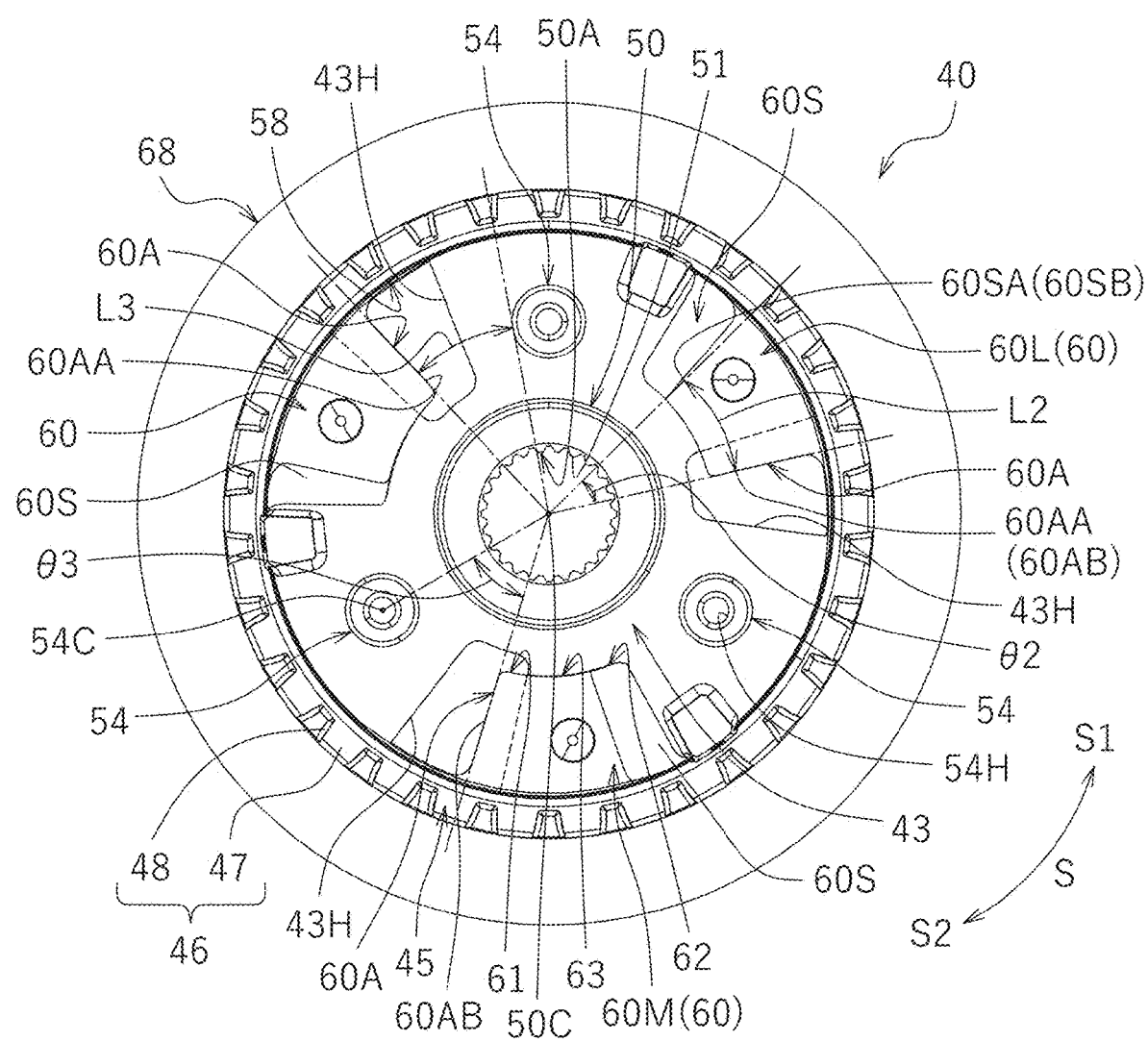
FIG. 3 is a plan view of the clutch center according to a preferred embodiment of the present invention.

Each of the center-side cam portions 60 has a truncated quadrangular pyramid shape having a cam surface including a slope acting as an Assist & Slipper (registered trademark) mechanism. The cam surface as the Assist & Slipper (registered trademark) mechanism generates an assist torque as a force to increase a pressing force (contact pressure force) between the input-side rotating plates 20 and the output-side rotating plates 22 or a slipper torque as a force separating the input-side rotating plates 20 and the output-side rotating plates 22 from each other on an early stage and shifting these plates into a half-clutch state. The center-side cam portions 60 project ahead of the base wall 43 in the second direction D2. As illustrated in FIG. 3, the center-side cam portions 60 are arranged at an equal interval in the circumferential direction S of the clutch center 40. In this preferred embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes a center-side assist cam portion 61 including a center-side assist cam surface 60A, a center-side slipper cam portion 62 including the center-side slipper cam surface 60S, and a center-side body 63 located between the center-side assist cam portion 61 and the center-side slipper cam portion 62. The center-side assist cam portion 61, the center-side body 63 and the center-side slipper cam portion 62 are integrally formed. In this preferred embodiment, the clutch center 40 rotates in the direction from the center-side assist cam portion 61 toward the center-side slipper cam portion 62 (i.e., in the first circumferential direction S1). The center-side body 63 is adjacent to the center-side assist cam portion 61. The center-side body 63 is located ahead of the center-side assist cam portion 61 in the rotation direction of the clutch center 40 (i.e., in the first circumferential direction S1). The center-side body 63 is adjacent to the center-side slipper cam portion 62. The center-side body 63 is located ahead of the center-side slipper cam portion 62 in a direction opposite to the rotation direction of the clutch center 40 (i.e., ahead in the second circumferential direction S2). The center-side assist cam surface 60A is configured to generate a force in such a direction as to cause the pressure plate 70 to approach the clutch center 40, in order to increase a pressing force (contact pressure force) between the input-side rotating plates 20 and the output-side rotating plates 22, when the clutch center 40 rotates with respect to the pressure plate 70. In this preferred embodiment, when this force is generated, the position of the pressure plate 70 with respect to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40, in order to decrease the pressing force (contact pressure force) between the input-side rotating plates 20 and the output-side rotating plates 22, when the clutch center 40 rotates with respect to the pressure plate 70. Regarding two of the center-side cam portions 60 adjacent to each other in the circumferential direction S, the center-side assist cam surface 60A of one center-side cam portion 60L and the center-side slipper cam surface 60S of the other center-side cam portion 60M are opposed to each other in the circumferential direction S.

Figure 14:
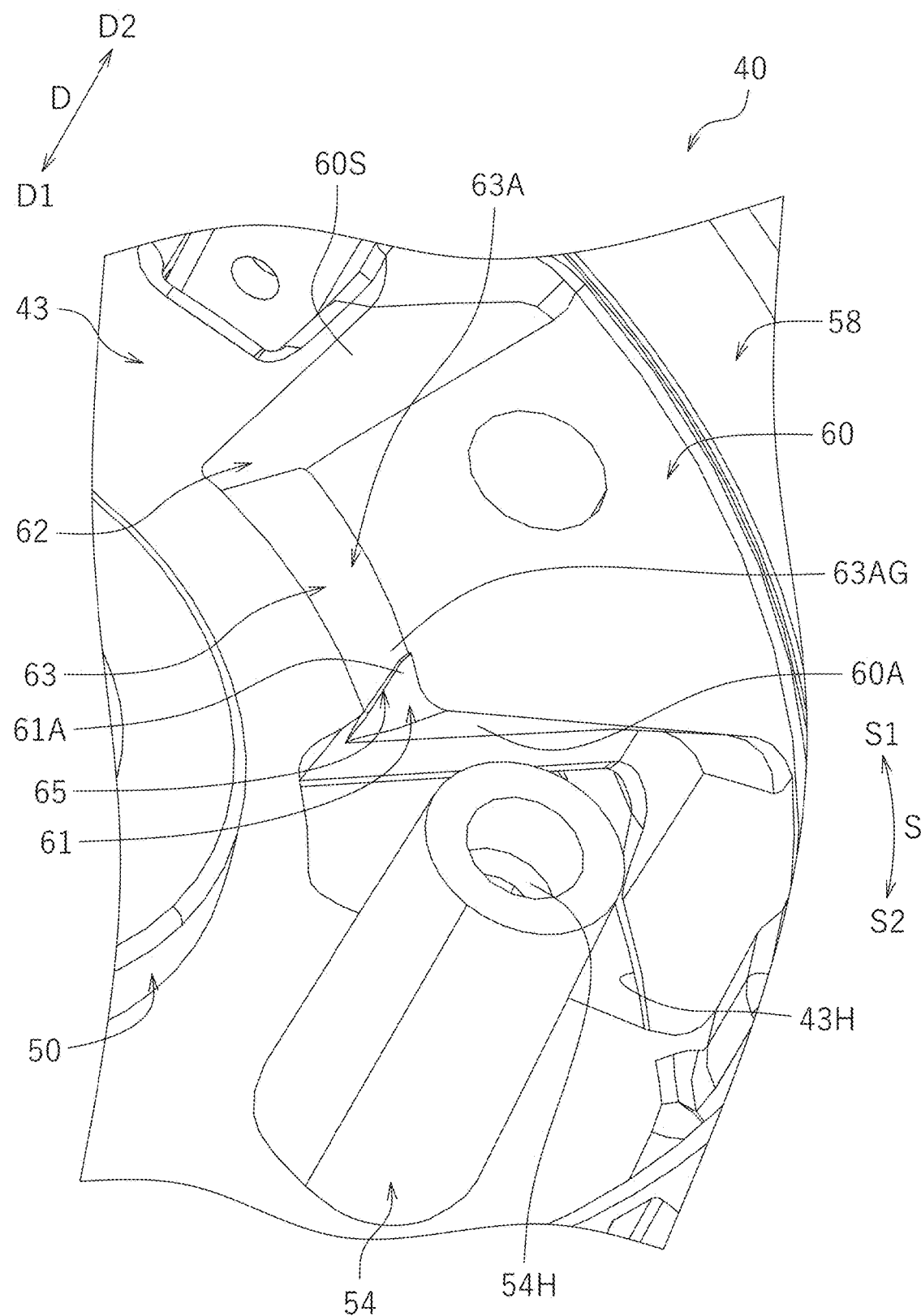
FIG. 14 is a perspective view illustrating a structure of a third stepped portion and the vicinity thereof according to a preferred embodiment of the present invention.

As illustrated in FIG. 14, the center-side cam portion 60 includes a third stepped portion 65 located between a main inner circumferential surface 63A of the center-side body 63 and a sub inner circumferential surface 61A of the center-side assist cam portion 61. The third stepped portion 65 is an example of stepped portion. The third stepped portion 65 extends in the axial direction of the output shaft 15 (i.e., in the direction D). The third stepped portion 65 is inclined so as to be radially more outward as extending in the second direction D2. The third stepped portion 65 may be parallel with the axial direction of the output shaft 15. The sub inner circumferential surface 61A is located radially outward of the main inner circumferential surface 63A. The sub inner circumferential surface 61A is inclined radially outward in the first direction D1. That is, the sub inner circumferential surface 61A is inclined so as to be radially more outward and more away from the main inner circumferential surface 63A as extending in the first direction D1. The sub inner circumferential surface 61A may be parallel with the axial direction of the output shaft 15. The sub inner circumferential surface 61A is connected with the center-side assist cam surface 60A. Among portions of the main inner circumferential surface 63A, at least a stepped portion-side inner circumferential surface 63AG adjacent to the third stepped portion 65 is inclined radially inward in the first direction D1. That is, the stepped portion-side inner circumferential surface 63AG is inclined so as to be radially more inward and more away from the sub inner circumferential surface 61A as extending in the first direction D1. As a result, the length of the third stepped portion 65 in the radial direction (i.e., the height of the third stepped portion 65) becomes longer (i.e., higher) as extending in the first direction D1. The main inner circumferential surface 63A may be inclined radially inward in the first direction D1 throughout the length thereof. Clutch oil flowing on the main inner circumferential surface 63A, for example, flows along the third stepped portion 65, and thus is easily guided to the sub inner circumferential surface 61A and is supplied to the center-side assist cam surface 60A.

As illustrated in FIG. 2, the clutch center 40 includes the plurality of (for example, three in this preferred embodiment) bosses 54. The bosses 54 support the pressure plate 70. The plurality of bosses 54 are arranged at an equal interval in the circumferential direction S. Each of the bosses 54 has a cylindrical shape. The bosses 54 are located radially outward of the output shaft holding portion 50. The bosses 54 extend toward the pressure plate 70 (i.e., in the second direction D2). The bosses 54 are located on the base wall 43. The bosses 54 each have a screw hole 54H, into which a bolt 28 (see FIG. 1) is inserted. The screw hole 54H extends in the axial direction of the clutch center 40.

As illustrated in FIG. 2, the center-side fitting portion 58 is located radially outward of the output shaft holding portion 50. The center-side fitting portion 58 is located radially outward of the center-side cam portions 60. The center-side fitting portion 58 is located ahead of the center-side cam portions 60 in the second direction D2. The center-side fitting portion 58 is located on an inner circumferential surface of the outer circumferential wall 45. The center-side fitting portion 58 is configured to be slidably moved onto a pressure-side fitting portion 88 (see FIG. 4) described below. The inner diameter of the center-side fitting portion 58 has a fitting tolerance allowing distribution of clutch oil flowing out of a distal end 15T of the output shaft 15 to the pressure-side fitting portion 88. That is, a gap is located between the center-side fitting portion 58 and the pressure-side fitting portion 88 described below. In this preferred embodiment, for example, the center-side fitting portion 58 has an inner diameter larger than the outer diameter of the pressure-side fitting portion 88 by about 0.1 mm, for example. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIGS. 2 and 3, the clutch center 40 has center-side cam holes 43H penetrating a portion of the base wall 43. Each of the center-side cam holes 43H extends from a position to the side of the output shaft holding portion 50 to the outer circumferential wall 45. The center-side cam hole 43H is located between the center-side assist cam surface 60A of the center-side cam portion 60 and the boss 54. As seen in the axial direction of the clutch center 40, the center-side assist cam surface 60A overlaps a portion of the center-side cam hole 43H.

As illustrated in FIG. 2, an R surface 43AR is located at a portion facing each of center-side cam holes 43H and connecting an inner circumferential surface 45A of the outer circumferential wall 45 and the base wall 43. The R surface 43AR has a corner R. The R surface 43AR has an R (i.e., radius) becoming shorter as extending in the second direction D2 from the side of the flange 68.

As illustrated in FIG. 1, the pressure plate 70 is movable toward or away from the clutch center 40 and rotatable with respect to the clutch center 40. The pressure plate 70 is configured to be capable of pressing the input-side rotating plates 20 and the output-side rotating plates 22. The pressure plate 70 is located coaxially with the clutch center 40 and the clutch housing 30. The pressure plate 70 includes a body 72, and a flange 98 connected with an outer circumferential edge, on the side of the second direction D2, of the body 72 and extending radially outward. The body 72 projects ahead of the flange 98 in the first direction D1. The pressure plate 70 holds at least a portion of the plurality of output-side rotating plates 22 arranged alternately with the input-side rotating plates 20.

Figure 4:
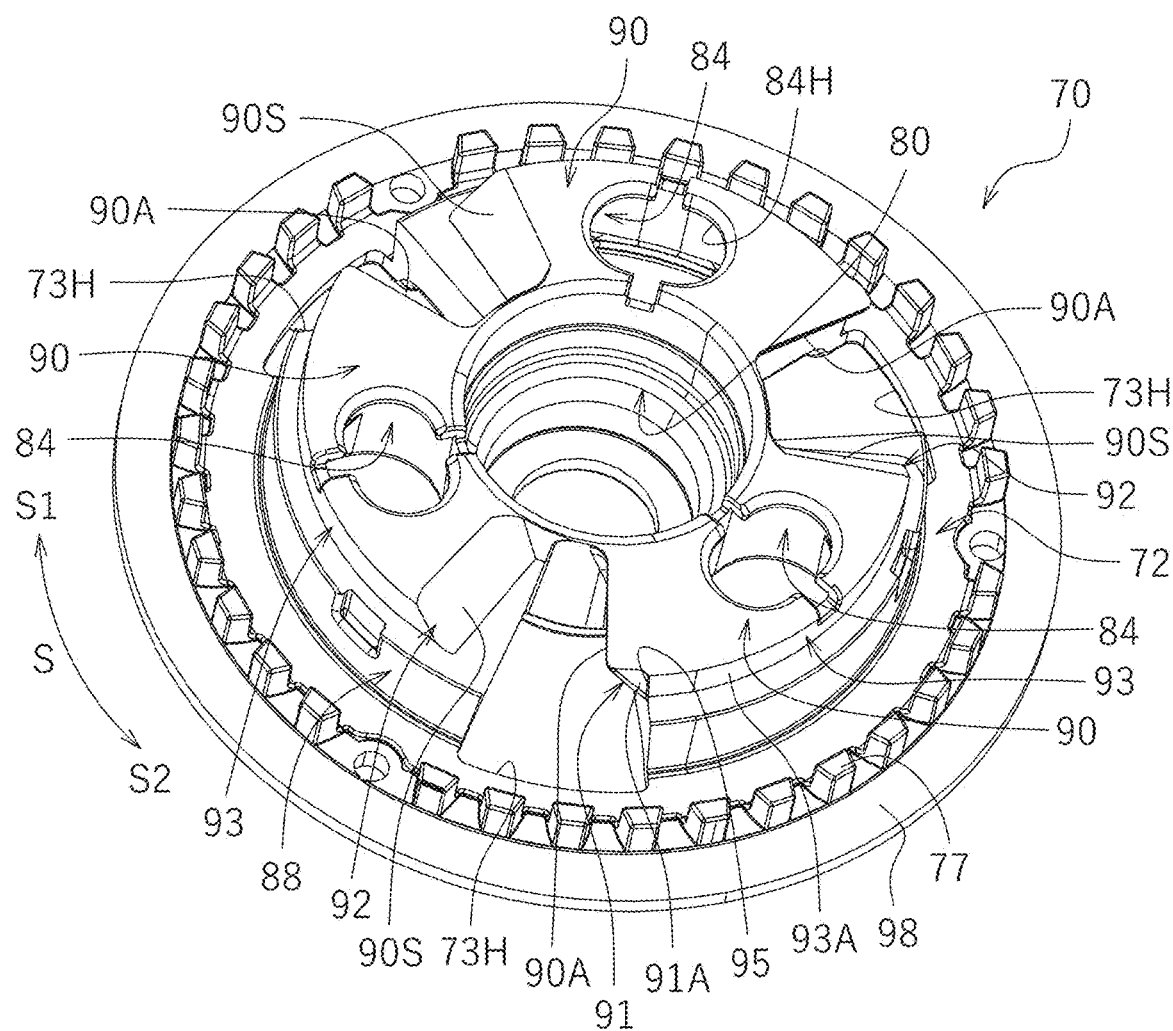
FIG. 4 is a perspective view of a pressure plate according to a preferred embodiment of the present invention.
Figure 6:
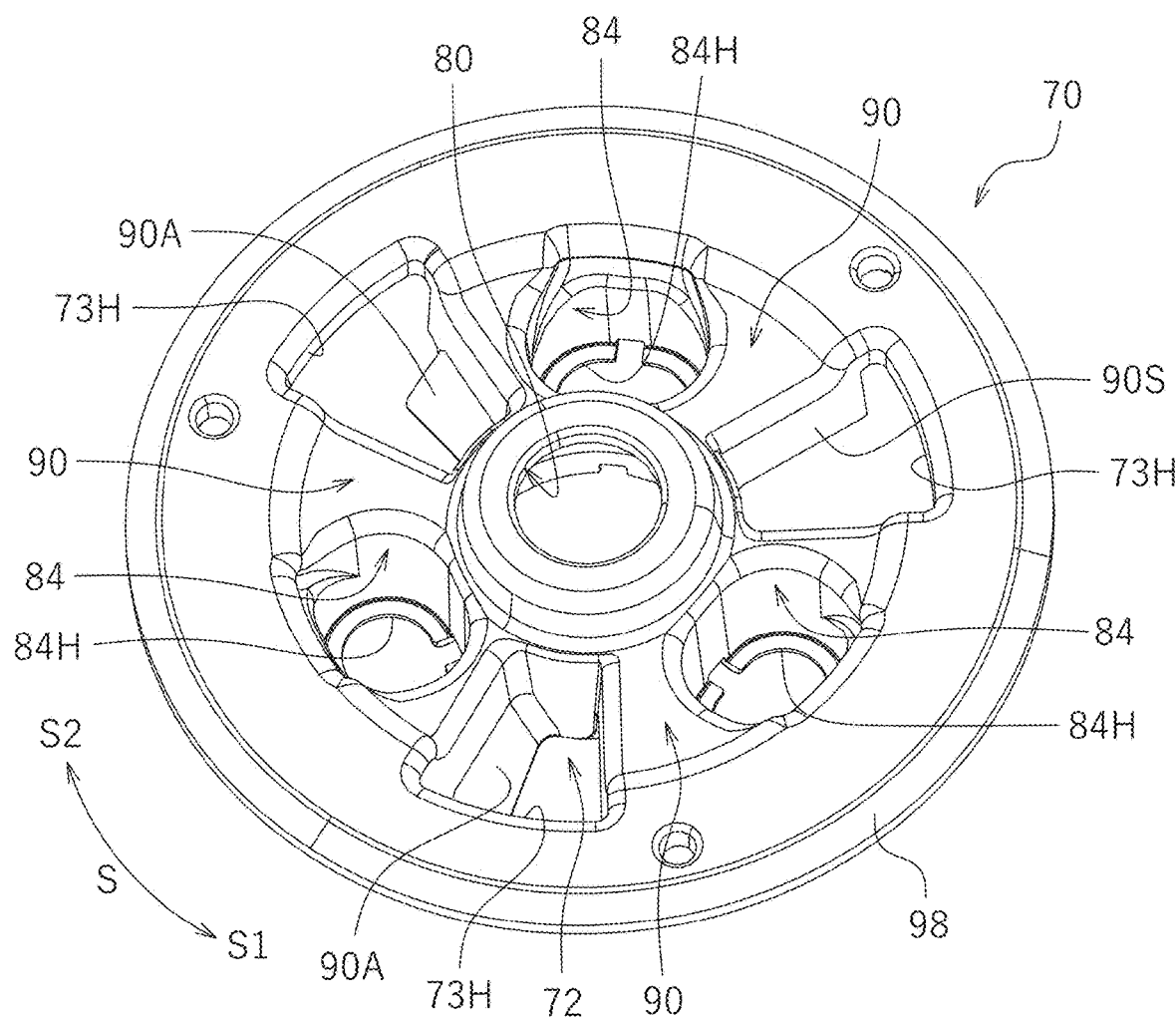
FIG. 6 is a perspective view of the pressure plate according to a preferred embodiment of the present invention.

As illustrated in FIG. 4, the body 72 includes a cylindrical portion 80, the plurality of pressure-side cam portions 90, the pressure-side fitting portion 88, and spring housing portions 84 (see also FIG. 6).

Figure 13:
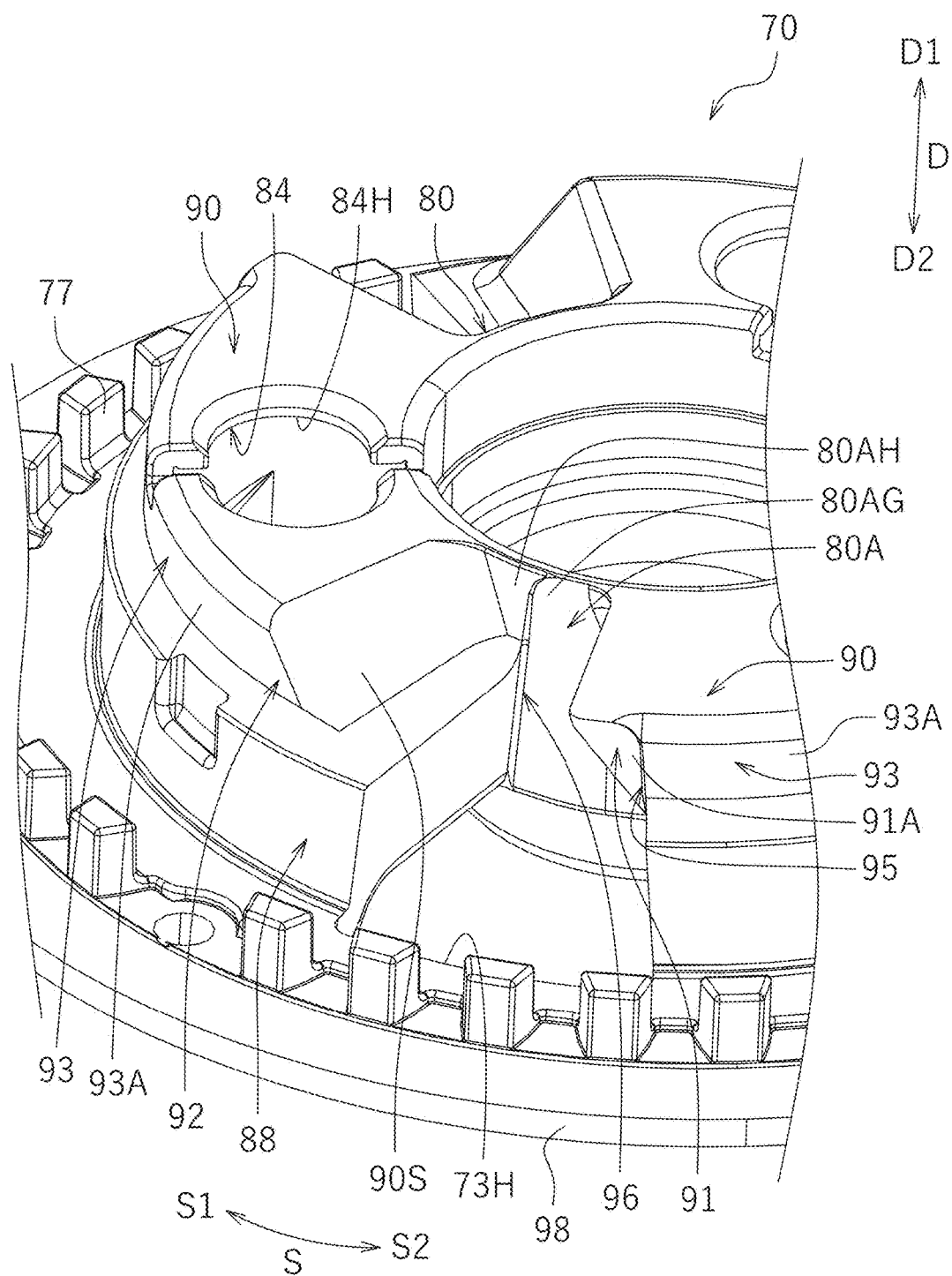
FIG. 13 is a perspective view illustrating a structure of a second stepped portion and the vicinity thereof according to a preferred embodiment of the present invention.

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil flowing out of the distal end 15T of the output shaft 15. As illustrated in FIG. 13, the cylindrical portion 80 has a cam hole-side outer circumferential surface 80AG located inward of a pressure-side cam hole 73H described below, and a cam portion-side outer circumferential surface 80AH adjacent to a pressure-side slipper cam portion 92 described below. The cam portion-side outer circumferential surface 80AH is located radially outward of the cam hole-side outer circumferential surface 80AG. The cam portion-side outer circumferential surface 80AH is continuous to the pressure-side slipper cam surface 90S.

Figure 5:
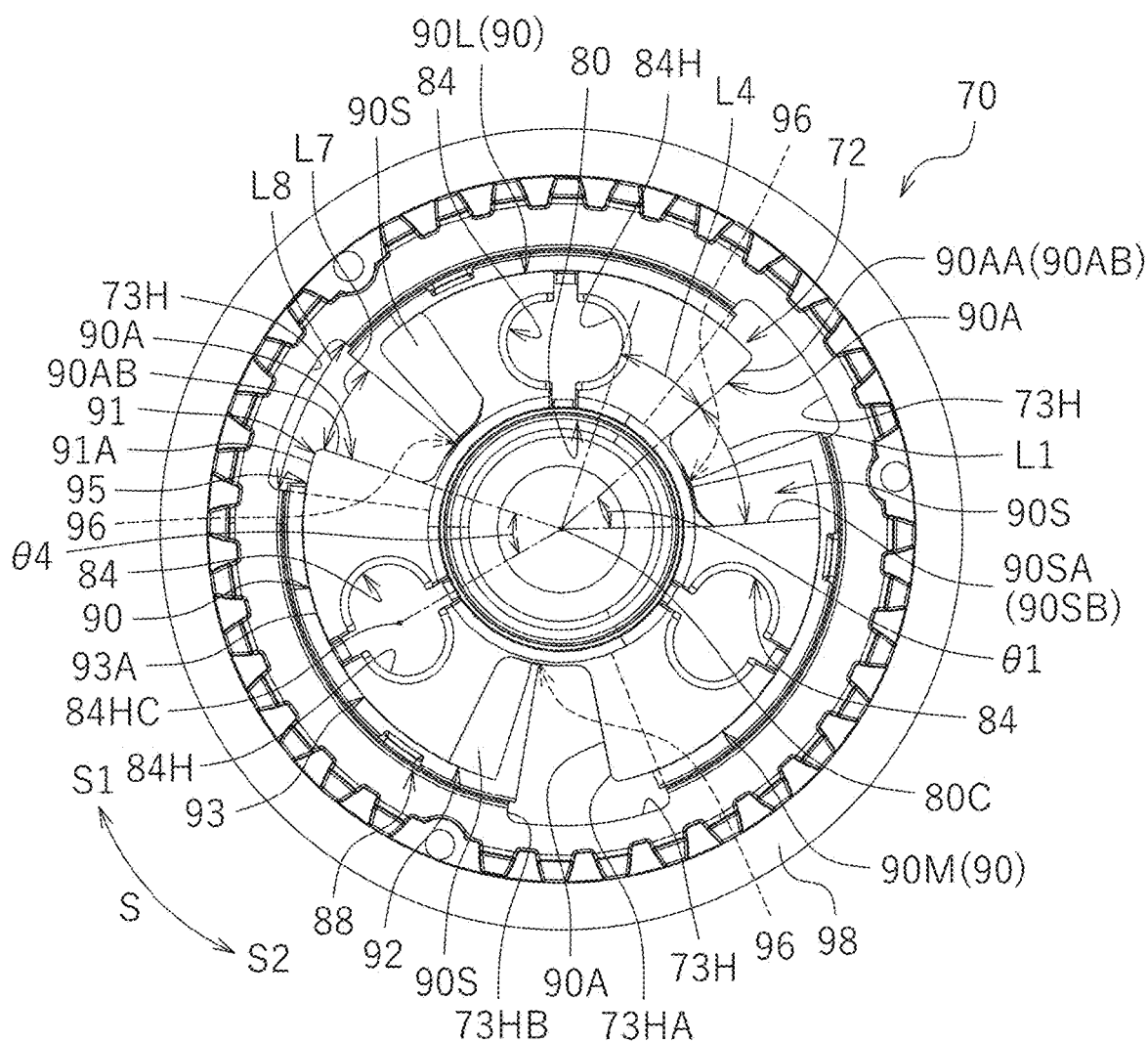
FIG. 5 is a plan view of the pressure plate according to a preferred embodiment of the present invention.

Each of the pressure-side cam portions 90 has a truncated quadrangular pyramid shape having a cam surface including a slope acting as an Assist & Slipper (registered trademark) mechanism. The cam surface as the Assist & Slipper (registered trademark) mechanism slides on the center-side cam portion 60 and generates an assist torque or a slipper torque. The pressure-side cam portion 90 projects ahead of the flange 98 in the first direction D1. As illustrated in FIG. 5, the pressure-side cam portions 90 are arranged at an equal interval in the circumferential direction S of the pressure plate 70. In this preferred embodiment, the pressure plate 70 includes three pressure-side cam portions 90, but the number of the pressure-side cam portions 90 is not limited to three.

Figure 9:
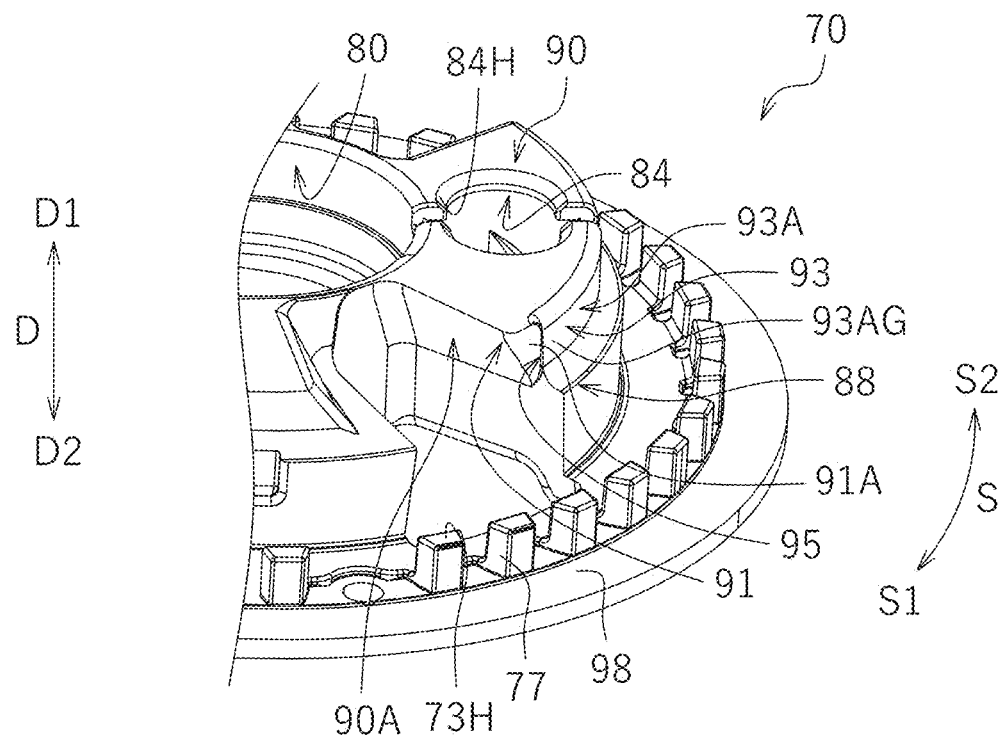
FIG. 9 is an enlarged perspective view of a portion of the pressure plate according to one preferred embodiment of the present invention.

As illustrated in FIG. 5, the pressure-side cam portions 90 are located radially outward of the cylindrical portion 80. Each of the pressure-side cam portions 90 includes a pressure-side assist cam portion 91 including a pressure-side assist cam surface 90A (see also FIGS. 7 and 9), the pressure-side slipper cam portion 92 including the pressure-side slipper cam surface 90S, and a pressure-side body 93 located between the pressure-side assist cam portion 91 and the pressure-side slipper cam portion 92. The pressure-side assist cam portion 91, the pressure-side body 93 and the pressure-side slipper cam portion 92 are integrally formed. In this preferred embodiment, the pressure plate 70 rotates in the direction from the pressure-side body 93 toward the pressure-side assist cam portion 91 (i.e., in the first circumferential direction S1). The pressure-side body 93 is adjacent to the pressure-side assist cam portion 91. The pressure-side body 93 is located ahead of the pressure-side assist cam portion 91 in a direction opposite to the rotation direction of the pressure plate 70 (i.e., ahead in the second circumferential direction S2). The pressure-side body 93 is adjacent to the pressure-side slipper cam portion 92. The pressure-side body 93 is located ahead of the pressure-side slipper cam portion 92 in the rotation direction of the pressure plate 70 (i.e., in the first circumferential direction S1). The pressure-side assist cam surface 90A is configured to be contactable with the center-side assist cam surface 60A. The pressure-side assist cam surface 90A is configured to generate a force in such a direction as to cause the pressure plate 70 to approach the clutch center 40, in order to increase a pressing force (contact pressure force) between the input-side rotating plates 20 and the output-side rotating plates 22, when the pressure plate 70 rotates with respect to the clutch center 40. The pressure-side slipper cam surface 90S is configured to be contactable with the center-side slipper cam surface 60S. The pressure-side slipper cam surface 90S is configured to separate the pressure plate 70 from the clutch center 40, in order to decrease the pressing force (contact pressure force) between the input-side rotating plates 20 and the output-side rotating plates 22, when the pressure plate 70 rotates with respect to the pressure plate 70. Regarding two of the pressure-side cam portions 90 adjacent to each other in the circumferential direction S, the pressure-side assist cam surface 90A of one pressure-side cam portion 90L and the pressure-side slipper cam surface 90S of the other pressure-side cam portion 90M are opposed to each other in the circumferential direction S. The pressure-side slipper cam surface 90S is opposed to the pressure-side assist cam surface 90A with the pressure-side body 93 being located therebetween.

Figure 12:
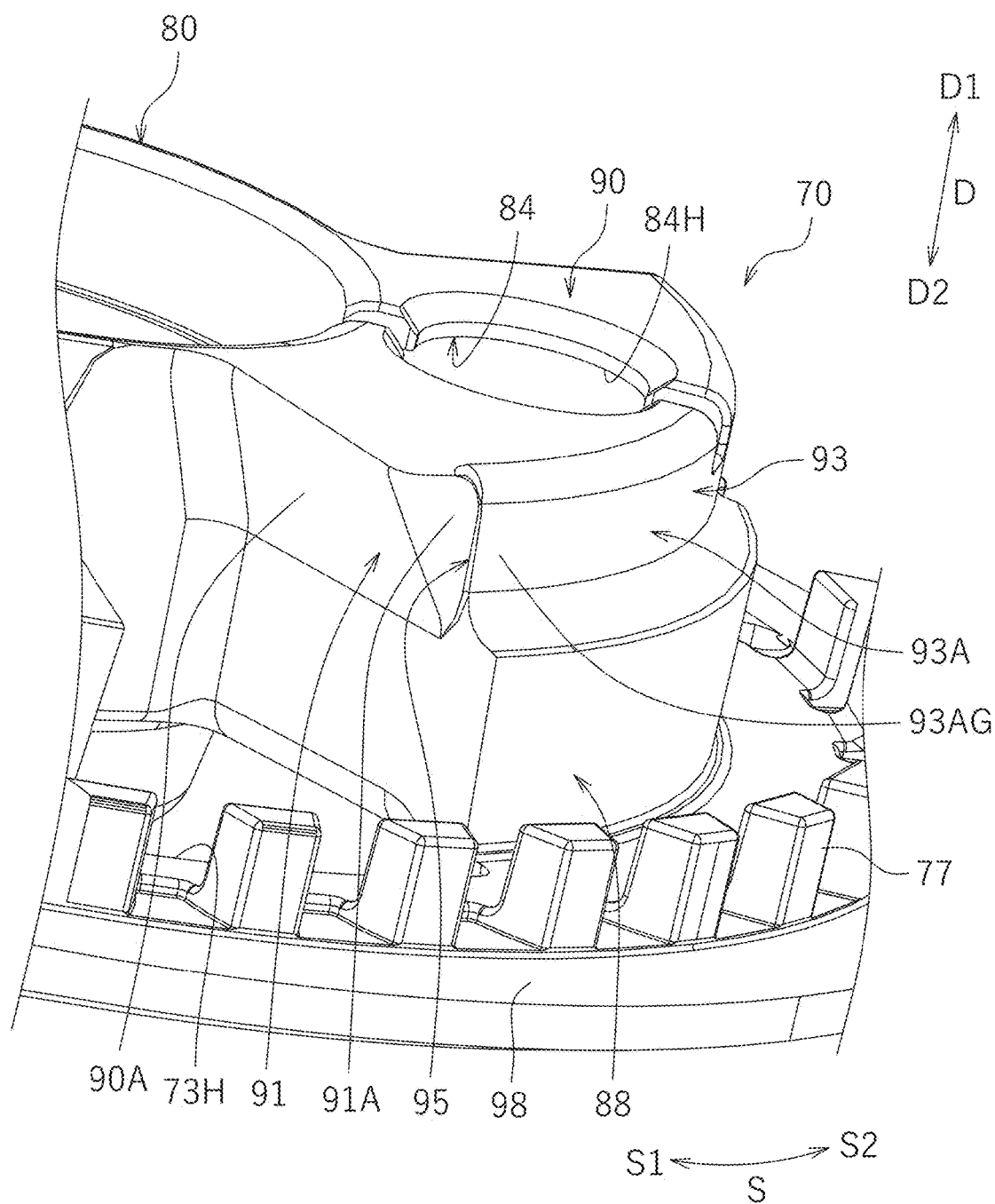
FIG. 12 is a perspective view illustrating a structure of a first stepped portion and the vicinity thereof according to a preferred embodiment of the present invention.

As illustrated in FIG. 12, the pressure-side cam portion 90 includes a first stepped portion 95 located between a main outer circumferential surface 93A of the pressure-side body 93 and a sub outer circumferential surface 91A of the pressure-side assist cam portion 91. The first stepped portion 95 is an example of stepped portion. The first stepped portion 95 extends in the axial direction of the output shaft 15 (i.e., in the direction D). The first stepped portion 95 is inclined so as to be radially more outward as extending in the second direction D2. The first stepped portion 95 may be parallel with the axial direction of the output shaft 15. The sub outer circumferential surface 91A is located radially inward of the main outer circumferential surface 93A. The sub outer circumferential surface 91A is inclined radially inward in the second direction D2. That is, the sub outer circumferential surface 91A is inclined so as to be radially more inward and more away from the main outer circumferential surface 93A as extending in the second direction D2. The sub outer circumferential surface 91A may be parallel with the axial direction of the output shaft 15. The sub outer circumferential surface 91A is connected with the pressure-side assist cam surface 90A. Among portions of the main outer circumferential surface 93A, at least a stepped portion-side outer circumferential surface 93AG adjacent to the first stepped portion 95 is inclined radially outward in the second direction D2. That is, the stepped portion-side outer circumferential surface 93AG is inclined so as to be radially more outward and more away from the sub outer circumferential surface 91A as extending in the second direction D2. As a result, the length of the first stepped portion 95 in the radial direction (i.e., the height of the first stepped portion 95) becomes longer (i.e., higher) as extending in the second direction D2. The main outer circumferential surface 93A may be inclined radially outward in the second direction D2 throughout the length thereof. Clutch oil flowing on the sub outer circumferential surface 91A in the second direction D2 is stopped by the first stepped portion 95 and thus accumulates on the sub outer circumferential surface 91A. As a result, the clutch oil accumulated on the sub outer circumferential surface 91A is supplied to the pressure-side assist cam surface 90A.

Figure 8:
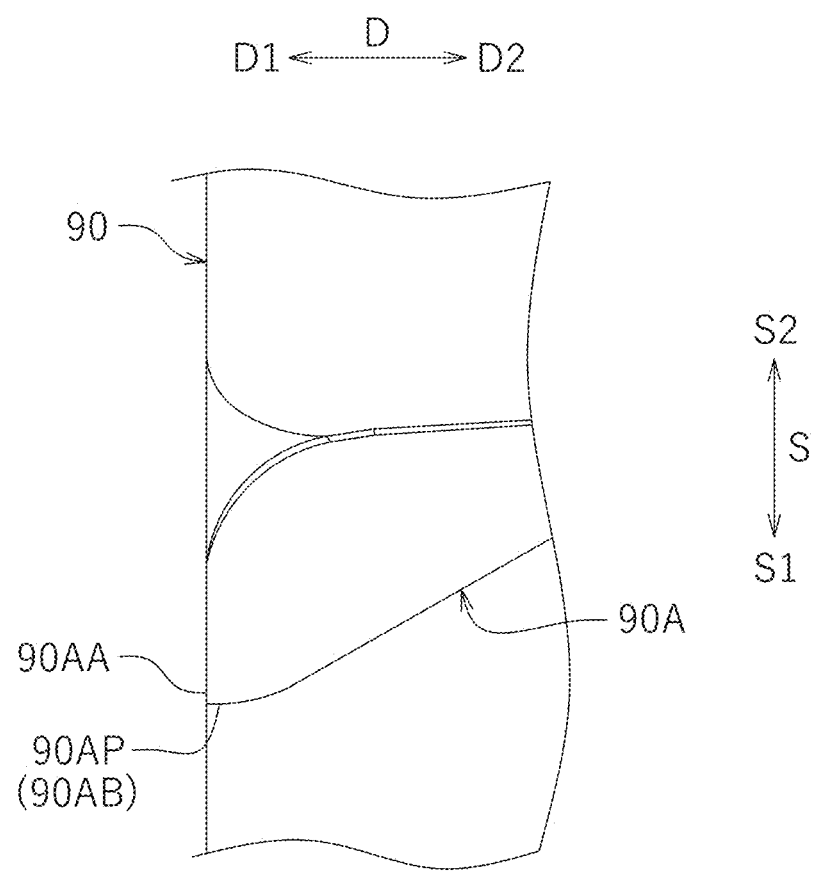
FIG. 8 is an enlarged side view of a portion of a pressure-side cam portion according to a preferred embodiment of the present invention.

As illustrated in FIG. 8, an end, in the circumferential direction S, of the pressure-side assist cam surface 90A of the pressure-side cam portion 90 has a chamfered portion 90AP that is linearly chamfered. A corner of the chamfered portion 90AP (corner on the side of the first direction D1 and the first circumferential direction S1) includes a right angle. More specifically, the chamfered portion 90AP is located at an end 90AB, on the side of the first circumferential direction S1, of the pressure-side assist cam surface 90A.

Figure 11A:
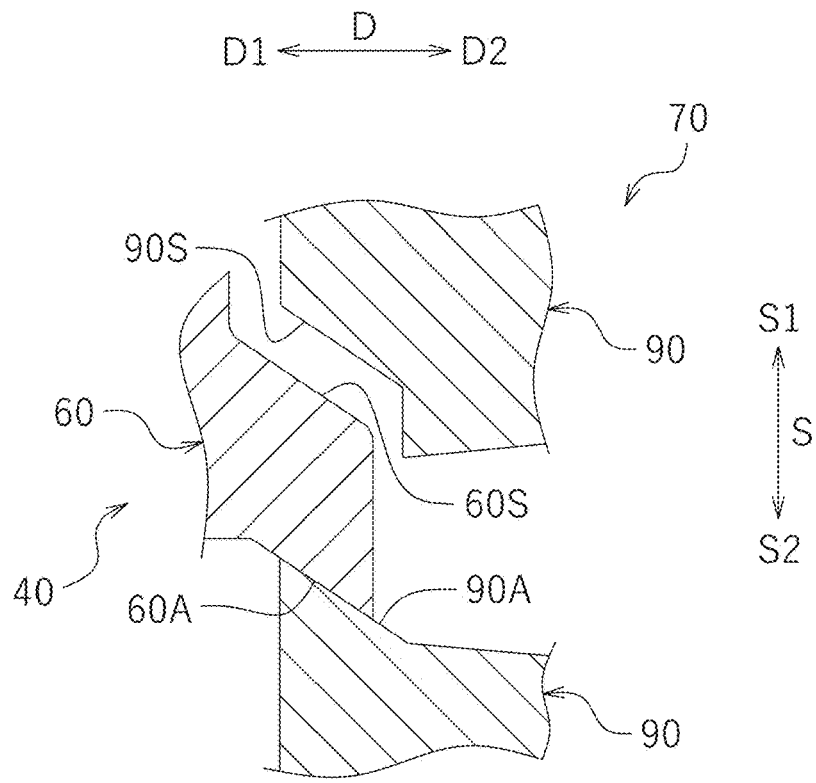
FIG. 11A is a schematic view for describing effects of a center-side assist cam surface and a pressure-side assist cam surface.

Effects of the center-side cam portions 60 and the pressure-side cam portions 90 will now be described. Referring to FIG. 11A, when the rotation speed of the engine increases so that a rotation driving force input to the input gear 35 and the clutch housing 30 is allowed to be transferred to the output shaft 15 through the clutch center 40, a rotation force in the first circumferential direction S1 is applied to the pressure plate 70. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 11B:
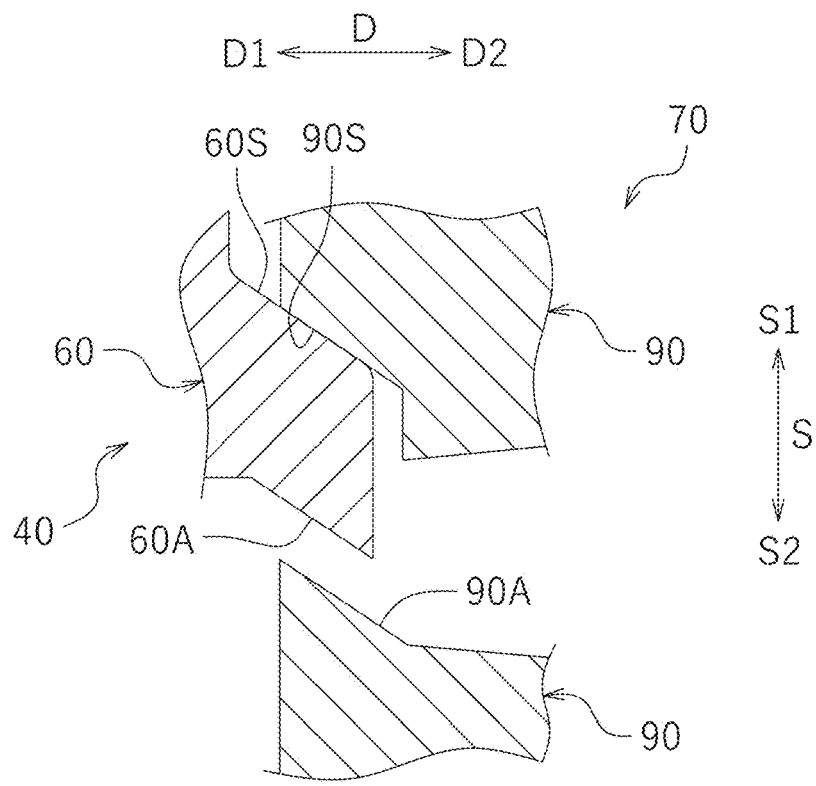
FIG. 11B is a schematic view for describing effects of a center-side slipper cam surface and a pressure-side slipper cam surface.

By contrast, referring to FIG. 11B, when the rotation speed of the output shaft 15 exceeds the rotation speed of the input gear 35 and the clutch housing 30 and a back torque is generated, a rotation force in the first circumferential direction S1 is applied to the clutch center 40. Thus, with the effects of the center-side slipper cam surface 60S and the pressure-side slipper cam surface 90S, the pressure plate 70 moves in the second direction D2 to cancel the contact pressure force between the input-side rotating plates 20 and the output-side rotating plates 22. In this manner, inconveniences regarding the engine and the transmission caused by the back torque are avoided.

As illustrated in FIG. 4, the pressure-side fitting portion 88 is located radially outward of the pressure-side cam portions 90. The pressure-side fitting portion 88 is located ahead of the pressure-side cam portions 90 in the second direction D2. The pressure-side fitting portion 88 is configured to be slidably inserted into the center-side fitting portion 58 (see FIG. 2).

Figure 7:
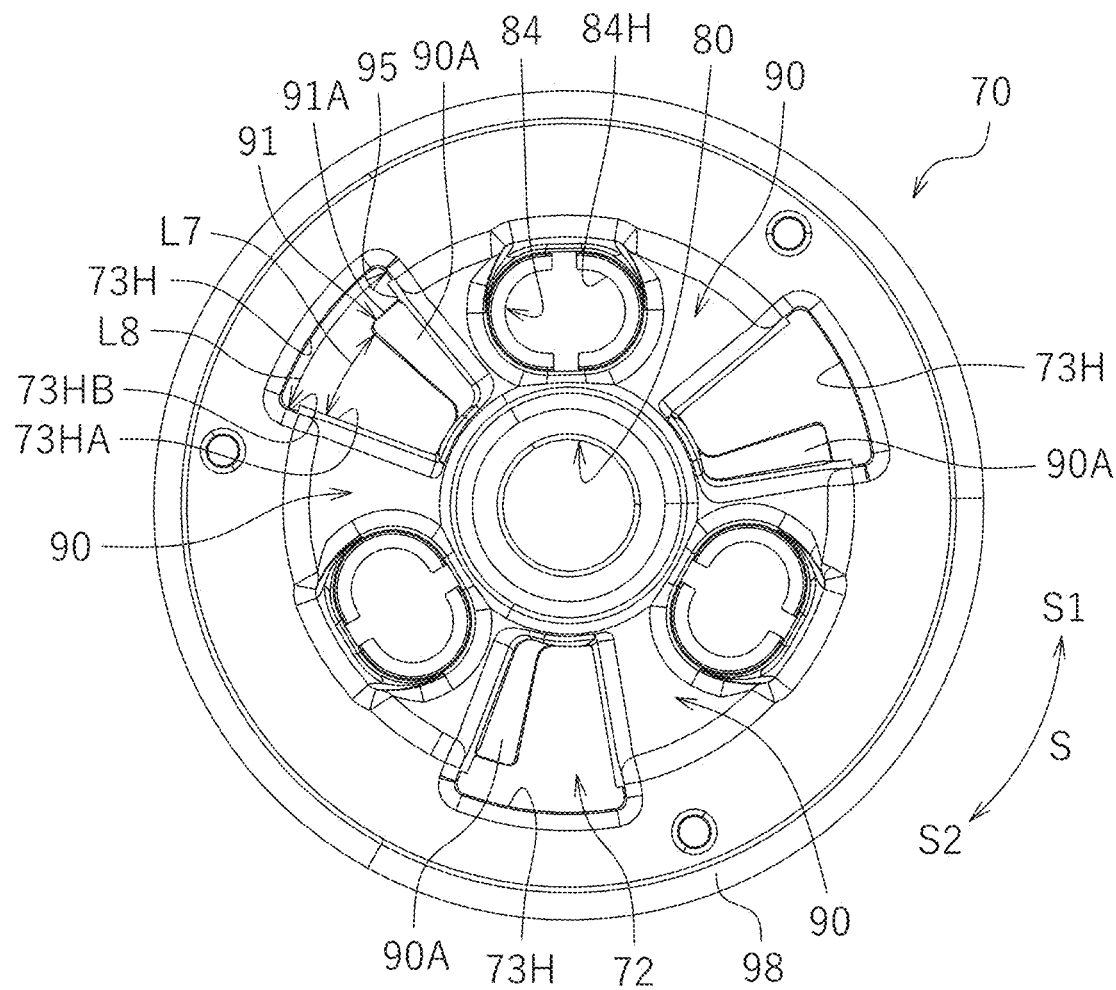
FIG. 7 is a plan view of the pressure plate according to a preferred embodiment of the present invention.

As illustrated in FIGS. 4 and 5, the pressure plate 70 has pressure-side cam holes 73H penetrating the body 72 and a portion of the flange 98. The pressure-side cam holes 73H are located radially outward of the cylindrical portion 80. Each of the pressure-side cam holes 73H extends from a position to the side of the cylindrical portion 80 to a position radially outward of the pressure-side fitting portion 88. The pressure-side cam hole 73H is located between the pressure-side assist cam surface 90A and the pressure-side slipper cam surface 90S of adjacent ones of the pressure-side cam portions 90. As illustrated in FIGS. 5 and 7, as seen in the axial direction of the pressure plate 70, the pressure-side assist cam surface 90A overlaps a portion of the pressure-side cam hole 73H. As seen in the axial direction of the output shaft 15, the pressure-side cam hole 73H includes a first portion 73HA having a first length L7, in the circumferential direction S, from one of two ends thereof in the circumferential direction S to the sub outer circumferential surface 91A, and a second portion 73HB located radially outward of the first portion 73HA and having a second length L8, in the circumferential direction S, from the one end thereof to the other end thereof in the circumferential direction S. The second length L8 is longer than the first length L7.

As illustrated in FIG. 4, the pressure plate 70 includes the plurality of pressure-side fitting teeth 77 located on the flange 98. The pressure-side fitting teeth 77 hold the output-side rotating plates 22. The pressure-side fitting teeth 77 project in the first direction D1 from the flange 98. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The plurality of pressure-side fitting teeth 77 are arranged in the circumferential direction S. The plurality of pressure-side fitting teeth 77 are arranged at an equal interval in the circumferential direction S. In this preferred embodiment, some of the pressure-side fitting teeth 77 are removed, and thus the interval between the pressure-side fitting teeth 77 sandwiching such a removed pressure-side fitting tooth 77 is longer. The other pressure-side fitting teeth 77 are arranged at an equal interval.

As illustrated in FIGS. 6 and 7, the spring housing portions 84 are located in the pressure-side cam portions 90. The spring housing portions 84 are recessed from the second direction D2 to the first direction D1. Each of the spring housing portions 84 has an oval cross-section. The spring housing portion 84 houses a pressure spring 25 (see FIG. 1). The spring housing portion 84 has an insertion hole 84H, into which the boss 54 (see FIG. 2) is inserted. That is, the insertion hole 84H penetrates the pressure-side cam portion 90. The insertion hole 84H has an oval cross-section.

As illustrated in FIG. 1, the pressure springs 25 are housed in the spring housing portions 84. Each of the pressure springs 25 is held by the boss 54 inserted into the insertion hole 84H of the spring housing portion 84. The pressure spring 25 biases the pressure plate 70 toward the clutch center 40 (i.e., in the first direction D1). The pressure spring 25 is, for example, a coil spring such as a helically wound spring steel.

Figure 10:
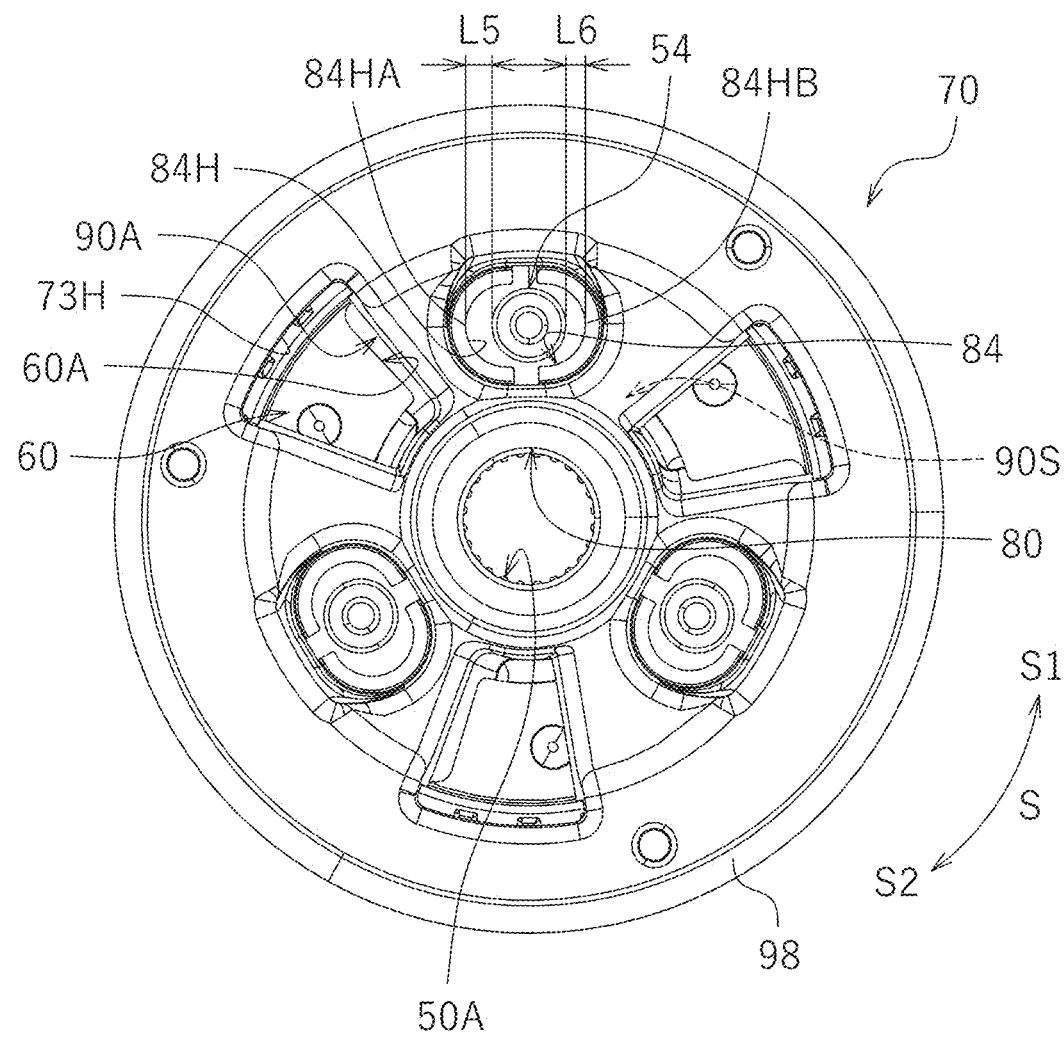
FIG. 10 is a plan view illustrating a state where the clutch center and the pressure plate according to a preferred embodiment of the present invention are assembled.

FIG. 10 is a plan view illustrating a state where the clutch center 40 and the pressure plate 70 are assembled. In the state illustrated in FIG. 10, the pressure-side assist cam surfaces 90A and the center-side assist cam surfaces 60A are not in contact with each other, and the pressure-side slipper cam surfaces 90S and the center-side slipper cam surfaces 60S are not in contact with each other. This is a state where the pressure plate 70 is closest to the clutch center 40. This state will be defined as a normal state of the clutch device 10. As illustrated in FIG. 10, in the normal state, a distance L5 in the circumferential direction S between each boss 54 and an end 84HA, on the side of the pressure-side assist cam surface 90A (i.e., on the side of the first circumferential direction S1), of the insertion hole 84H is shorter than a distance L6 in the circumferential direction S between the boss 54 and an end 84HB, on the side of the pressure-side slipper cam surface 90S (i.e., on the side of the second circumferential direction S2), of the insertion hole 84H.

As shown in FIG. 13, the pressure plate 70 includes second stepped portions 96 each provided between an outer circumferential surface 80A of the cylindrical portion 80 and the pressure-side slipper cam portion 92. The second stepped portion 96 is an example of stepped portion. The second stepped portion 96 is located between the cam hole-side outer circumferential surface 80AG and the cam portion-side outer circumferential surface 80AH. The second stepped portion 96 extends in the axial direction of the output shaft 15 (i.e., in the direction D). The second stepped portion 96 is inclined so as to be radially more outward as extending in the second direction D2. The second stepped portion 96 may be parallel with the axial direction of the output shaft 15. The outer circumferential surface 80A of the cylindrical portion 80 is located radially inward of the pressure-side slipper cam portion 92. The second stepped portion 96 is located ahead of the pressure-side slipper cam surface 90S in the second circumferential direction S2. The second stepped portion 96 extends from an end, on the side of the first direction D1, of the cylindrical portion 80 to an end, on the side of the second direction D2, of the pressure-side fitting portion 88. The second stepped portion 96 extends to the pressure-side cam hole 73H. As seen in the axial direction of the output shaft 15, the second stepped portion 96 is adjacent to a radially innermost portion of an edge, on the side of the first circumferential direction S1, of the pressure-side cam hole 73H. The cam hole-side outer circumferential surface 80AG of the cylindrical portion 80 is inclined radially outward in the second direction D2. The cam portion-side outer circumferential surface 80AH of the cylindrical portion 80 is inclined radially outward in the second direction D2. As a result, the length of the second stepped portion 96 in the radial direction (i.e., the height of the second stepped portion 96) becomes longer (i.e., higher) as extending in the second direction D2. Clutch oil flowing on the outer circumferential surface 80A of the cylindrical portion 80, for example, flows along the second stepped portion 96, and thus flows on the outer circumferential surface 80A in the second circumferential direction S2 and is supplied to the pressure-side assist cam surface 90A of the pressure-side assist cam portion 91.

As illustrated in FIG. 1, the stopper plate 100 is contactable with the pressure plate 70. The stopper plate 100 suppresses separation of the pressure plate 70 from the clutch center 40 by a predetermined distance or more in the second direction D2. The stopper plate 100 is secured to the bosses 54 of the clutch center 40 with the bolts 28. The pressure plate 70 is secured by the bolts 28 fastened to the bosses 54 through the stopper plate 100 in a state where the bosses 54 and the pressure springs 25 of the clutch center 40 are located in the spring housing portions 84. The stopper plate 100 is substantially triangular as seen in a plan view.

When the pressure plate 70 is in contact with the stopper plate 100, the pressure-side slipper cam surface 90S and the center-side slipper cam surface 60S are in contact with each other by about 50% or more and about 90% or less of the area of the pressure-side slipper cam surface 90S and about 50% or more and about 90% or less of the area of the center-side slipper cam surface 60S, for example. When the pressure plate 70 is in contact with the stopper plate 100, the pressure springs 25 are separated from side walls of the spring housing portions 84. That is, the pressure springs 25 are not sandwiched between the bosses 54 and the spring housing portions 84, and application of excessive stress to the bosses 54 is suppressed.

Now, referring to FIG. 5, two of the pressure-side cam portions 90 adjacent to each other in the circumferential direction S, specifically, one pressure-side cam portion 90L and the other pressure-side cam portion 90M will be discussed. The pressure-side assist cam surface 90A, of the pressure-side cam portion 90L, on the side of the first circumferential direction S1 has an end 90AA on the side of the first direction D1. The pressure-side slipper cam surface 90S, of the pressure-side cam portion 90M, on the side of the second circumferential direction S2 has an end 90SA on the side of the first direction D1. Referring to FIG. 3, the center-side assist cam surface 60A of each center-side cam portion 60 has an end 60AA on the side of the second direction D2, and the center-side slipper cam surface 60S of the center-side cam portion 60 has an end 60SA on the side of the second direction D2. A length L1 (see FIG. 5) in the circumferential direction S from the end 90AA to the end 90SA is longer than a length L2 (see FIG. 3) in the circumferential direction S from the end 60AA to the end 60SA.

Referring to FIG. 5, the pressure-side assist cam surface 90A, of the pressure-side cam portion 90L, on the side of the first circumferential direction S1 has the end 90AB on the side of the first circumferential direction S1. The pressure-side slipper cam surface 90S, of the pressure-side cam portion 90M, on the side of the second circumferential direction S2 has an end 90SB on the side of the first circumferential direction S1. Referring to FIG. 3, the center-side assist cam surface 60A of the center-side cam portion 60 has an end 60AB on the side of the second circumferential direction S2. The center-side slipper cam surface 60S of the center-side cam portion 60 has an end 60SB on the side of the second circumferential direction S2. As seen in the axial direction of the output shaft 15, an angle $\theta 1$ (see FIG. 5) defined by the center of the pressure plate 70 (in this preferred embodiment, a center 80C of the cylindrical portion 80), the end 90AB and the end 90SB is larger than an angle $\theta 2$ (see FIG. 3) defined by a center 50C of the output shaft holding portion 50, the end 60AB and the end 60SB. The angle $\theta 1$ is defined by a straight line passing the center 80C of the cylindrical portion 80 and the end 90AB and a straight line passing the center 80C and the end 90SB. The angle $\theta 2$ is defined by a straight line passing the center 50C of the output shaft holding portion 50 and the end 60AB and a straight line passing the center 50C and the end 60SB.

A length L3 (see FIG. 3) in the circumferential direction S from the end 60AA, on the side of the second direction D2, of the center-side assist cam surface 60A to the boss 54 is longer than a length L4 (see FIG. 5) in the circumferential direction S from the end 90AA, on the side of the first direction D1, of the pressure-side assist cam surface 90A to the insertion hole 84H.

As seen in the axial direction of the output shaft 15, an angle $\theta 3$ (see FIG. 3) defined by the center 50C of the output shaft holding portion 50, the end 60AB, on the side of the second circumferential direction S2, of the center-side assist cam surface 60A of the center-side cam portion 60 and a center 54C of the boss 54 is larger than an angle $\theta 4$ (see FIG. 5) defined by the center of the pressure plate 70 (in this preferred embodiment, the center 80C of the cylindrical portion 80), the end 90AB, on the side of the first circumferential direction S1, of the pressure-side assist cam surface 90A and a center 84HC of the insertion hole 84H. The angle θ4 is defined by a straight line passing the center 50C of the output shaft holding portion 50 and the end 60AB and a straight line passing the center 50C and the center 54C of the boss 54. The angle θ3 is defined by a straight line passing the center 80C of the cylindrical portion 80 and the end 90AB and a straight line passing the center 80C and the center 84HC of the insertion hole 84H.

The clutch device 10 is filled with a predetermined amount of clutch oil. The clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil suppresses absorption of heat and abrasion of the friction members. The clutch device 10 according to this preferred embodiment is a so-called multiplate wet friction clutch device.

An operation of the clutch device 10 according to this preferred embodiment will now be described. As described above, the clutch device 10 is located between the engine and the transmission of the motorcycle, and allows or blocks transfer of a rotation driving force of the engine to the transmission by an operation by a driver on a clutch operation lever.

In the case where the driver of the motorcycle does not operate the clutch operation lever, the clutch device 10 operates as follows. A clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state, in which the input-side rotating plates 20 and the output-side rotating plates 22 are pushed against each other to be frictioncoupled, and the clutch hug is rotationally driven. That is, a rotation driving force of the engine is transferred to the clutch center 40, and the output shaft 15 is rotationally driven.

In the clutch-ON state, clutch oil flowing in the hollow portion 15H of the output shaft 15 and then flowing out of the distal end 15T of the output shaft 15 is dropped or spattered into the cylindrical portion 80 and attached to the cylindrical portion 80 (see arrow F in FIG. 1). The clutch oil attached to the inside of the cylindrical portion 80 is guided into the clutch center 40. Accordingly, the clutch oil flows to the outside of the clutch center 40 through the oil flow holes 49. The clutch oil also flows to the outside of the clutch center 40 through the gap between the center-side fitting portion 58 and the pressure-side fitting portion 88. Then, the clutch oil flowing to the outside of the clutch center 40 is supplied to the input-side rotating plates 20 and the output-side rotating plates 22.

By contrast, when the driver of the motorcycle operates the clutch operation lever in the clutch-ON state, the clutch device 10 operates as follows. The clutch release mechanism (not shown) presses the push rod 16A, and thus, the pressure plate 70 is displaced in a direction away from the clutch center 40 (in the second direction D2) against a biasing force of the pressure springs 25. Accordingly, the clutch center 40 enters a clutch-OFF state, in which the friction coupling between the input-side rotating plates 20 and the output-side rotating plates 22 is canceled, and thus, rotational driving attenuates or stops. That is, the rotation driving force of the engine is blocked and is not transferred to the clutch center 40.

In the clutch-OFF state, clutch oil flowing in the hollow portion 15H of the output shaft 15 and then flowing out of the distal end 15T of the output shaft 15 is guided into the clutch center 40 in the same manner as in the clutch-ON state. At this point, the pressure plate 70 is separated from the clutch center 40, and thus, the amount of fitting between the pressure plate 70 and each of the center-side fitting portion 58 and the pressure-side fitting portion 88 decreases. As a result, the clutch oil in the cylindrical portion 80 more actively flows to the outside of the clutch center 40, and is distributed to various portions in the clutch device 10. In particular, the clutch oil can be actively guided to gaps between the input-side rotating plates 20 and the output-side rotating plates 22 separated from each other.

Then, when the driver releases the clutch operation lever in the clutch-OFF state, the pressure plate 70 is released from the state of being pressed by the clutch release mechanism (not shown) through the push member 16B, and thus, the pressure plate 70 is displaced in a direction toward the clutch center 40 (first direction D1) by a biasing force of the pressure springs 25.

As described above, with the clutch device 10 according to this preferred embodiment, the pressure-side cam portions 90 each include the first stepped portion 95 between the main outer circumferential surface 93A of the pressure-side body 93 and the sub outer circumferential surface 91A of the pressure-side assist cam portion 91 and extending in the axial direction of the output shaft 15. The sub outer circumferential surface 91A is located radially inward of the main outer circumferential surface 93A. Among portions of the main outer circumferential surface 93A, at least the stepped portion-side outer circumferential surface 93AG adjacent to the first stepped portion 95 is inclined radially outward in the second direction D2. The pressure plate 70 is configured to rotate in the direction from the pressure-side body 93 toward the pressure-side assist cam portion 91 (i.e., in the first circumferential direction S1). Therefore, the clutch oil flowing on the sub outer circumferential surface 91A in the direction opposite to the above-mentioned direction (i.e., flowing in the second circumferential direction S2) is stopped by the first stepped portion 95 and thus accumulates on the sub outer circumferential surface 91A. The pressureside assist cam portion 91 including the sub outer circumferential surface 91A includes the pressure-side assist cam surface 90A. Therefore, the clutch oil accumulated on the sub outer circumferential surface 91A is supplied to the pressure-side assist cam surface 90A. The sub outer circumferential surface 91A and the stepped portion-side outer circumferential surface 93AG are inclined in opposite directions to each other with respect to the axial direction of the output shaft 15. Therefore, the height of the first stepped portion 95 is made higher, and thus the amount of the clutch oil accumulated on the sub outer circumferential surface 91A, that is, the amount of the clutch oil supplied to the pressure-side assist cam surface 90A is increased. In this manner, the clutch oil is effectively supplied to the pressureside assist cam surface 90A, and the clutch oil is also effectively supplied to the center-side assist cam surface 60A through the pressure-side assist cam surface 90A.

With the clutch device 10 according to this preferred embodiment, the pressure plate 70 includes the second stepped portion 96 between the cam hole-side outer circumferential surface 80AG and the cam portion-side outer circumferential surface 80AH of the cylindrical portion 80 and extending in the axial direction of the output shaft 15. The cam portion-side outer circumferential surface 80AH is located radially outward of the cam hole-side outer circumferential surface 80AG. The cam hole-side outer circumferential surface 80AG is inclined radially inward in the second direction D2, and the cam portion-side outer circumferential surface 80AH is inclined radially outward in the second direction D2. The pressure plate 70 is configured to rotate in the direction from the pressure-side body 93 toward the pressure-side assist cam portion 91 (i.e., in the first circumferential direction S1). Therefore, the clutch oil flowing on the outer circumferential surface 80A of the cylindrical portion 80, for example, flows along the second stepped portion 96, and thus flows on the outer circumferential surface 80A in the direction opposite to the above-mentioned direction (i.e., flows in the second circumferential direction S2) into the pressure-side assist cam portion 91. The cam hole-side outer circumferential surface 80AG and the cam portion-side outer circumferential surface 80AH are inclined in opposite directions to each other with respect to the axial direction of the output shaft 15. Therefore, the height of the second stepped portion 96 is made higher, and thus the amount of the clutch oil accumulated on the outer circumferential surface 80A of the cylindrical portion 80, that is, the amount of the clutch oil supplied to the pressure-side assist cam surface 90A is increased. In this manner, the clutch oil is effectively supplied to the pressure-side assist cam surface 90A, and the clutch oil is also effectively supplied to the center-side assist cam surface 60A through the pressure-side assist cam surface 90A.

With the clutch device 10 according to this preferred embodiment, the center-side cam portions 60 each include the third stepped portion 65 between the main inner circumferential surface 63A of the center-side body 63 and the sub inner circumferential surface 61A of the center-side assist cam portion 61 and extending in the axial direction of the output shaft 15. The sub inner circumferential surface 61A is located radially outward of the main inner circumferential surface 63A, and is inclined radially outward in the first direction D1. Among portions of the main inner circumferential surface 63A, at least the stepped portion-side inner circumferential surface 63AG adjacent to the third stepped portion 65 is inclined radially inward in the first direction D1. The clutch center 40 is configured to rotate in the direction from the center-side assist cam portion 61 toward the center-side body 63 (i.e., in the first circumferential direction S1). Therefore, the clutch oil flowing on the main inner circumferential surface 63A, for example, flows along the third stepped portion 65, and thus flows on the sub inner circumferential surface 61A. The center-side assist cam portion 61 including the sub inner circumferential surface 61A includes the center-side assist cam surface 60A. Therefore, the clutch oil flowing on the sub inner circumferential surface 61A is supplied to the center-side assist cam surface 60A. The sub inner circumferential surface 61A and the stepped portion-side inner circumferential surface 63AG are inclined in opposite directions to each other with respect to the axial direction of the output shaft 15. Therefore, the height of the third stepped portion 65 is made higher, and thus the amount of the clutch oil accumulated on the sub inner circumferential surface 61A, that is, the amount of the clutch oil supplied to the center-side assist cam surface 60A is increased. In this manner, the clutch oil is effectively supplied to the center-side assist cam surface 60A, and the clutch oil is also effectively supplied to the pressure-side assist cam surface 90A through the center-side assist cam surface 60A.

Second Preferred Embodiment

Figure 15:
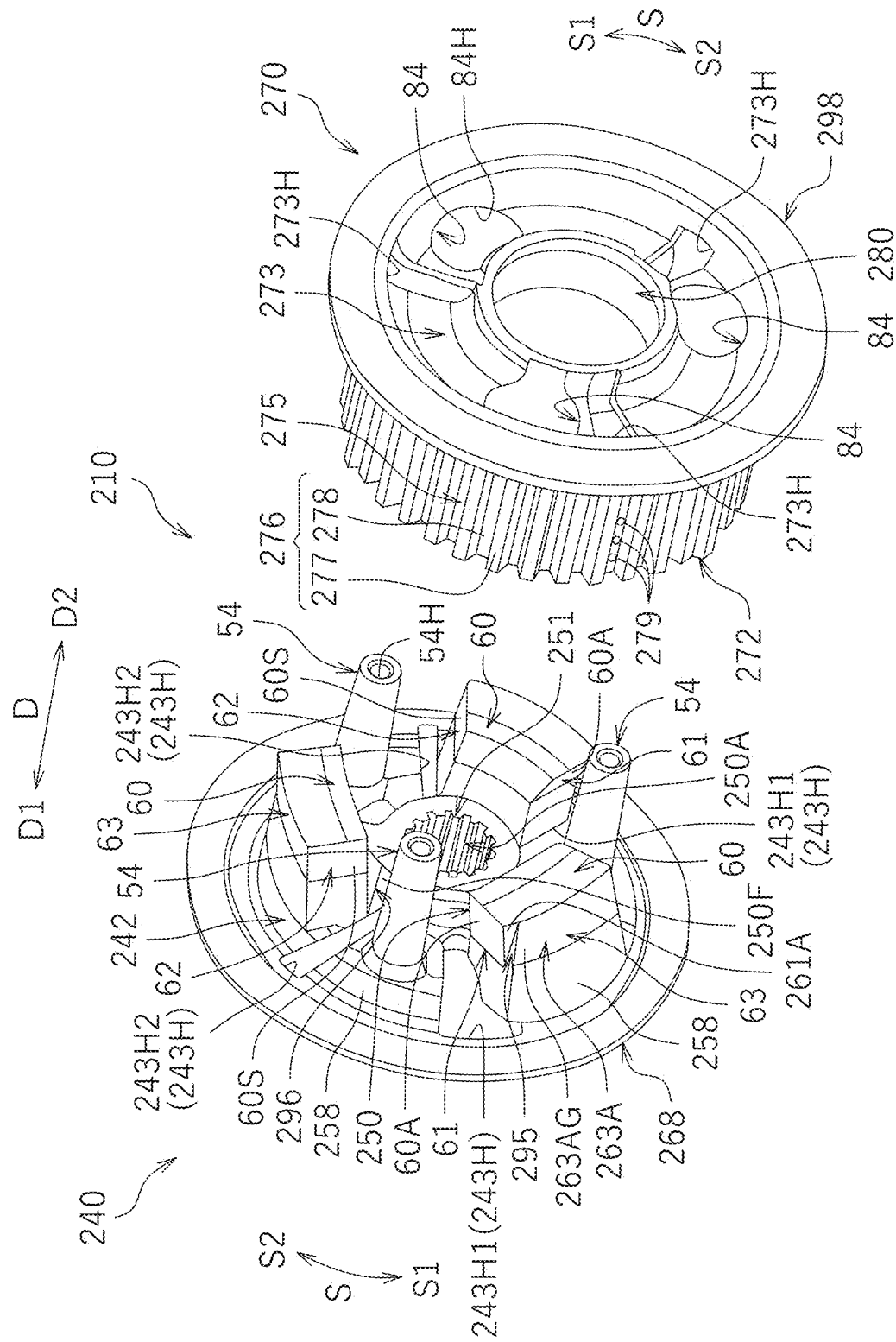
FIG. 15 is an exploded perspective view of a clutch center and a pressure plate according to another preferred embodiment of the present invention.

FIG. 15 is an exploded perspective view of a clutch center 240 and a pressure plate 270 of a clutch device 210 according to a second preferred embodiment.

The clutch center 240 is housed in the clutch housing 30 (see FIG. 1). The clutch center 240 and the clutch housing 30 are concentrically located. As shown in FIG. 15, the clutch center 240 includes a body 242 and a flange 268 connected with an outer circumferential edge, on the side of the first direction D1, of the body 242 and extending radially outward therefrom. The body 242 projects ahead of the flange 268 in the second direction D2. The clutch center 240 does not hold the output-side rotating plates 22. The clutch center 240 is rotationally drivable together with the output shaft 15 (see FIG. 1).

As shown in FIG. 15, the body 242 includes an output shaft holding portion 250, the plurality of center-side cam portions 60, and a center-side fitting portion 258. The center-side cam portions 60 project ahead of the flange 268 in the second direction D2. The center-side cam portions 60 are located radially outward of the output shaft holding portion 250.

The output shaft holding portion 250 has a cylindrical shape. The output shaft holding portion 250 has an insertion hole 251, in which the output shaft 15 (see FIG. 1) is inserted and spline-fitted. The insertion hole 251 penetrates the body 242. An inner circumferential surface 250A, of the output shaft holding portion 250, defining the insertion hole 251 has a plurality of spline grooves located along the axial direction thereof. The output shaft 15 is coupled with the output shaft holding portion 250.

As shown in FIG. 15, the clutch center 240 includes the plurality of (for example, three in this preferred embodiment) bosses 54. The bosses 54 are located radially outward of the output shaft holding portion 250. The bosses 54 are located on the body 242.

As shown in FIG. 15, each of the center-side cam portions 60 includes a fourth stepped portion 295 between a main outer circumferential surface 263A of the center-side body 63 and a sub outer circumferential surface 261A of the center-side assist cam portion 61. The fourth stepped portion 295 is an example of stepped portion. The fourth stepped portion 295 extends in the axial direction of the output shaft 15 (i.e., in the direction D). The fourth stepped portion 295 is inclined so as to be radially more outward as extending in the second direction D2. The fourth stepped portion 295 may be parallel with the axial direction of the output shaft 15. The sub outer circumferential surface 261A is located radially inward of the main outer circumferential surface 263A. The sub outer circumferential surface 261A is inclined radially inward in the first direction D1. That is, the sub outer circumferential surface 261A is inclined so as to be radially more inward and more away from the main outer circumferential surface 263A as extending in the first direction D1. The sub outer circumferential surface 261A may be parallel with the axial direction of the output shaft 15. The sub outer circumferential surface 261A is connected with the center-side assist cam surface 60A. Among portions of the main outer circumferential surface 263A, at least a stepped portion-side outer circumferential surface 263AG adjacent to the fourth stepped portion 295 is inclined radially outward in the first direction D1. That is, the stepped portion-side outer circumferential surface 263AG is inclined so as to be radially more outward and more away from the sub outer circumferential surface 261A as extending in the first direction D1. As a result, the length of the fourth stepped portion 295 in the radial direction (i.e., the height of the fourth stepped portion 295) becomes longer (i.e., higher) as extending in the first direction D1. The main outer circumferential surface 263A may be inclined radially outward in the first direction D1 throughout the length thereof. Clutch oil flowing on the main outer circumferential surface 263A in the second circumferential direction S2, for example, flows along the fourth stepped portion 295, and thus flows to the sub outer circumferential surface 261A. As a result, the clutch oil accumulated on the sub outer circumferential surface 261A is supplied to the center-side assist cam surface 60A.

Figure 16:
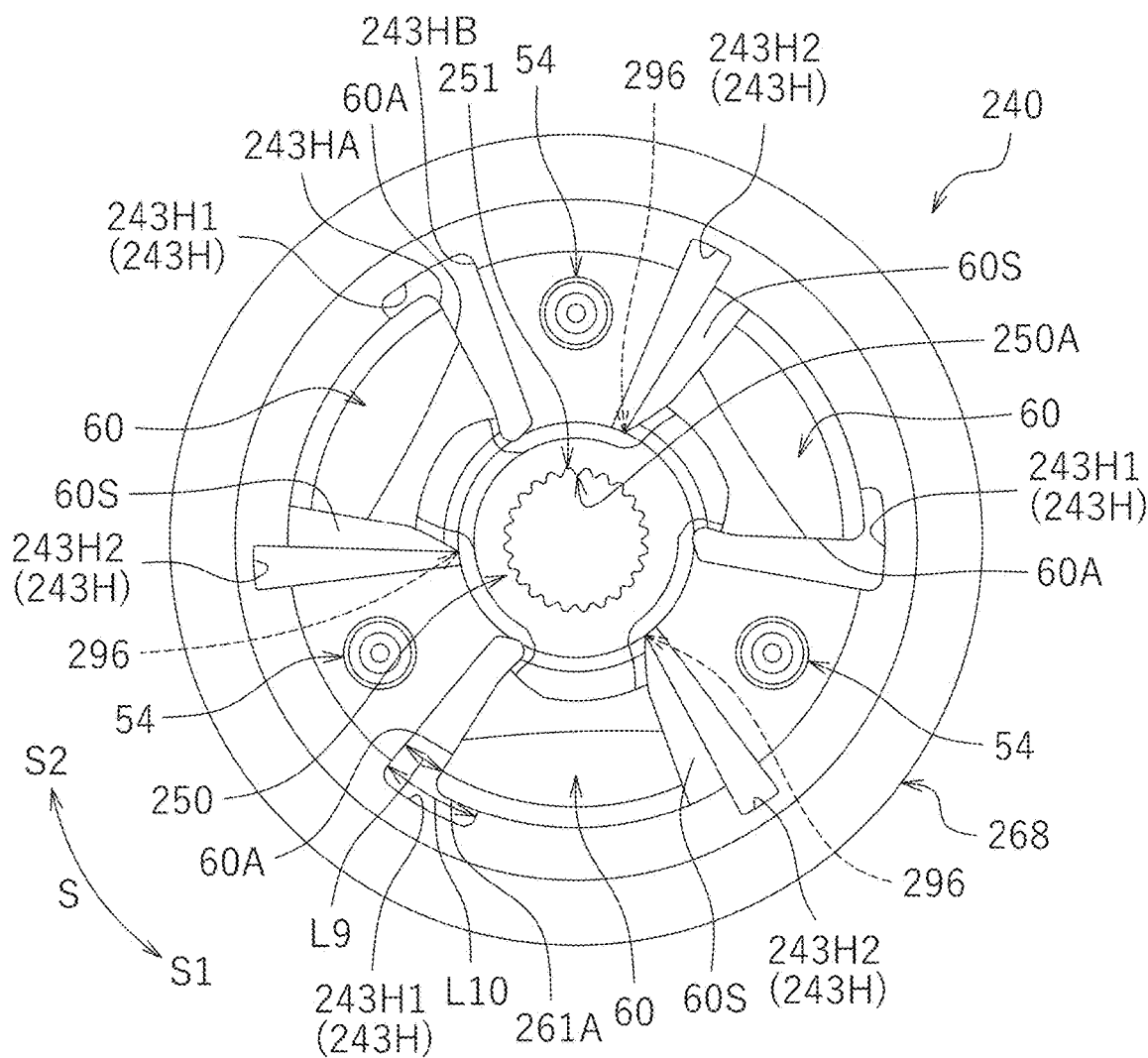
FIG. 16 is a plan view of a clutch center according to the another preferred embodiment of the present invention.

As shown in FIGS. 15 and 16, the clutch center 240 has center-side cam holes 243H penetrating the body 242 and a portion of the flange 268. The center-side cam holes 243H penetrate the body 242 and the flange 268 in the direction D. The center-side cam holes 243H are located radially outward of the output shaft holding portion 250. Each of the center-side cam holes 243H extends from a position to the side of the output shaft holding portion 250 to the flange 268. The center-side cam hole 243H is located between adjacent ones of the center-side cam portions 60. The center-side cam holes 243H include first center-side cam holes 243H1 each provided between the center-side assist cam surface 60A of the corresponding center-side cam portion 60 and the boss 54, and second center-side cam holes 243H2 each provided between the center-side slipper cam surface 60S of the corresponding center-side cam portion 60 and the boss 54. As seen in the axial direction of the clutch center 240, each center-side assist cam surface 60A overlaps a portion of the corresponding first center-side cam hole 243H1. As seen in the axial direction of the output shaft 15, the first center-side cam holes 243H1 each include a first portion 243HA having a first length L9, in the circumferential direction S, from one of two ends thereof in the circumferential direction S to the sub outer circumferential surface 261A, and a second portion 243HB located radially outward of the first portion 243HA and having a second length L10, in the circumferential direction S, from the one end thereof to the other end thereof in the circumferential direction S. The second length L10 is longer than the first length L9.

As shown in FIGS. 15 and 16, the clutch center 240 includes fifth stepped portions 296 each provided between an outer circumferential surface 250F of the output shaft holding portion 250 and the center-side slipper cam portion 62. Each of the fifth stepped portions 296 is an example of a stepped portion. The fifth stepped portion 296 extends in the axial direction of the output shaft 15 (i.e., in the direction D). The fifth stepped portion 296 is inclined so as to be radially more outward as extending in the first direction D1. The fifth stepped portion 296 may be parallel with the axial direction of the output shaft 15. The outer circumferential surface 250F of the output shaft holding portion 250 is located radially inward of the center-side slipper cam portion 62. The outer circumferential surface 250F of the output shaft holding portion 250 is inclined so as to be radially more inward as extending in the first direction D1. The fifth stepped portion 296 is located ahead of the center-side slipper cam surfaces 60S in the first circumferential direction S1. The fifth stepped portion 296 extends from an end, on the side of the second direction D2, of the output shaft holding portion 250 to an end, on the side of the first direction D1, of the center-side fitting portion 258. The fifth stepped portion 296 extends to the second center-side cam hole 243H2. As seen in the axial direction of the output shaft 15, the fifth stepped portion 296 is adjacent to a radially innermost portion of an edge, on the side of the second circumferential direction S2, of the second center-side cam hole 243H2.

As shown in FIG. 15, the center-side fitting portion 258 is provided on the body 242. The center-side fitting portion 258 is located radially outward of the center-side cam portions 60. The center-side fitting portion 258 is located ahead of the center-side cam portions 60 in the first direction D1. The center-side fitting portion 258 is configured to be slidably inserted into a pressure-side fitting portion 288 (see FIG. 17).

The pressure plate 270 is movable toward or away from the clutch center 240 and rotatable with respect to the clutch center 240. The pressure plate 270 is configured to be capable of pressing the input-side rotating plates 20 and the output-side rotating plates 22. The pressure plate 270 is located coaxially with the clutch center 240 and the clutch housing 30. The pressure plate 270 includes a cylindrical body 272, and a flange 298 extending radially outward from an outer circumferential edge of the body 272. The pressure plate 270 holds the plurality of output-side rotating plates 22 arranged alternately with the input-side rotating plates 20 in the direction D.

Figure 17:
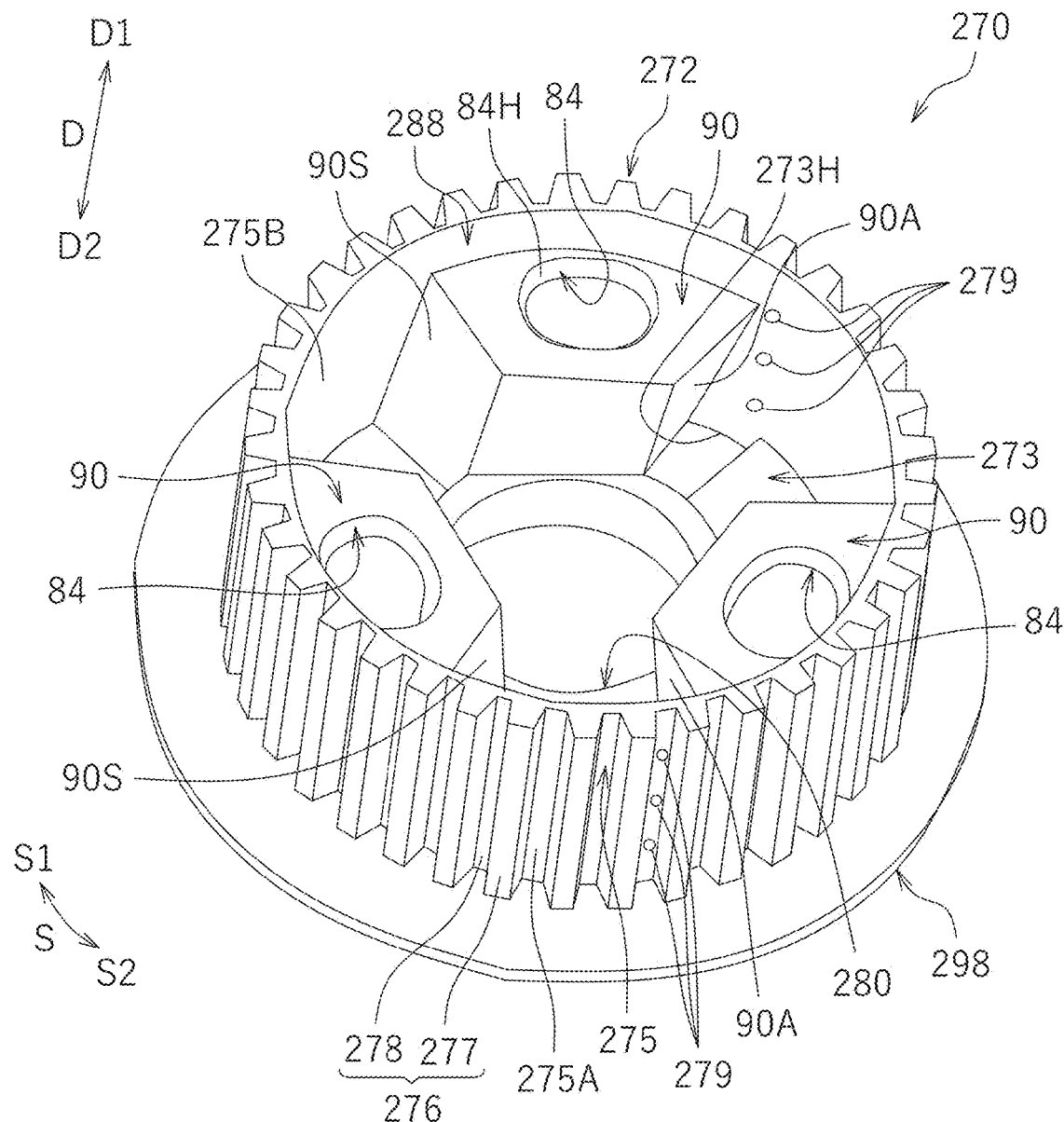
FIG. 17 is a perspective view of the pressure plate according to the another preferred embodiment of the present invention.

As illustrated in FIG. 17, the body 272 includes a ring-shaped base wall 273, an outer circumferential wall 275 located radially outward of the base wall 273 and extending in the first direction D1, a cylindrical portion 280 provided at the center of the base wall 273, the plurality of pressure-side cam portions 90 connected with the base wall 273 and the outer circumferential wall 275, the pressure-side fitting portion 288, and the spring housing portions 84 (see FIG. 15). The pressure-side cam portions 90 project in the first direction D1 from the body 272. The pressure-side cam portions 90 are located radially outward of the cylindrical portion 280. The pressure-side cam portions 90 are located radially inward of the outer circumferential wall 275.

The cylindrical portion 280 has a cylindrical shape. The cylindrical portion 280 is integrally formed with the pressure-side cam portions 90. The cylindrical portion 280 houses the distal end 15T of the output shaft 15 (see FIG. 1). The cylindrical portion 280 houses the release bearing 18 (see FIG. 1). The cylindrical portion 280 receives a pressing force from the push member 16B. The cylindrical portion 280 receives clutch oil flowing out of the distal end 15T of the output shaft 15.

As illustrated in FIG. 17, the outer circumferential wall 275 of the pressure plate 270 is located radially outward of the cylindrical portion 280. The outer circumferential wall 275 has a ring shape extending in the direction D. An outer circumferential surface 275A of the outer circumferential wall 275 has a spline fitting portion 276 . The spline fitting portion 276 includes a plurality of pressure-side fitting teeth 277 extending in an axial direction of the pressure plate 270 along the outer circumferential surface 275A of the outer circumferential wall 275, a plurality of spline grooves 278 each provided between adjacent ones of the pressure-side fitting teeth 277 and extending in the axial direction of the pressure plate 270, and oil flow holes 279. The pressure-side fitting teeth 277 hold the output-side rotating plates 22. The plurality of pressure-side fitting teeth 277 are arranged in the circumferential direction S. The plurality of pressure-side fitting teeth 277 are arranged at an equal interval in the circumferential direction S. The plurality of pressure-side fitting teeth 277 have the same shape. The pressure-side fitting teeth 277 project radially outward from the outer circumferential surface 275A of the outer circumferential wall 275. The oil flow holes 279 penetrate the outer circumferential wall 275 in the radial direction. The oil flow holes 279 are located between adjacent ones of the pressure-side fitting teeth 277. That is, the oil flow holes 279 are located in the spline grooves 278. The oil flow holes 279 are located to the side of the pressure-side cam portions 90. The oil flow holes 279 are located to the side of the pressure-side assist cam surfaces 90A of the pressure-side cam portions 90. The oil flow holes 279 are located ahead of the pressure-side assist cam surfaces 90A in the first circumferential direction S1. The oil flow holes 279 are located ahead of the pressure-side slipper cam surfaces 90S in the second circumferential direction S2. In this preferred embodiment, three oil flow holes 279 are provided at each of three positions in the circumferential direction S of the outer circumferential wall 275. The oil flow holes 279 are located at an equal interval in the circumferential direction S. The oil flow holes 279 cause the inside and the outside of the pressure plate 270 to communicate with each other. The oil flow holes 279 allow clutch oil, flowing out from the output shaft 15 into the pressure plate 270, to flow to the outside of the pressure plate 270. In this preferred embodiment, the oil flow holes 279 allow clutch oil, flowing on an inner circumferential surface 275B of the outer circumferential wall 275, to flow to the outside of the pressure plate 270. At least a portion of the oil flow holes 279 is provided at a position opposing the center-side fitting portion 258 (see FIG. 15).

The output-side rotating plates 22 are held by the spline fitting portion 276 of the pressure plate 270. The output-side rotating plates 22 are held by the pressure-side fitting teeth 277 and the spline grooves 278 by spline fitting. The output-side rotating plates 22 are displaceable along the axial direction of the pressure plate 270. The output-side rotating plates 22 are rotatable together with the pressure plate 270.

As illustrated in FIGS. 15 and 17, the pressure plate 270 has pressure-side cam holes 273H penetrating a portion of the base wall 273. The pressure-side cam holes 273H penetrate the base wall 273 in the direction D. The pressure-side cam holes 273H are located radially outward of the cylindrical portion 280. Each of the pressure-side cam holes 273H extends from a position to the side of the cylindrical portion 280 to the outer circumferential wall 275. The pressure-side cam hole 273H is located between adjacent ones of the pressure-side cam portions 90 while penetrating the base wall 273. The pressure-side cam hole 273H is located between the pressure-side assist cam surface 90A and the pressure-side slipper cam surface 90S of adjacent one of the pressure-side cam portions 90 while penetrating the base wall 273. As seen in the axial direction of the pressure plate 270, the pressure-side assist cam surface 90A overlaps a portion of the pressure-side cam hole 273H. Clutch oil flows into the pressure-side cam hole 273H from the outside of the pressure plate 270.

As illustrated in FIG. 17, the pressure-side fitting portion 288 is located radially outward of the cylindrical portion 280. The pressure-side fitting portion 288 is located radially outward of the pressure-side cam portions 90. The pressure-side fitting portion 288 is located ahead of the pressure-side cam portions 90 in the first direction D1. The pressure-side fitting portion 288 is located on the inner circumferential surface 275B of the outer circumferential wall 275. The pressure-side fitting portion 288 is configured to be slidably moved onto the center-side fitting portion 258 (see FIG. 15). A gap is located between the pressure-side fitting portion 288 and the center-side fitting portion 258.

As described above, with the clutch device 210 according to this preferred embodiment, the center-side cam portions 60 each include the fourth stepped portion 295 located between the main outer circumferential surface 263A of the center-side body 63 and the sub outer circumferential surface 261A of the center-side assist cam portion 61 and extending in the axial direction of the output shaft 15. The sub outer circumferential surface 261A is located radially inward of the main outer circumferential surface 263A. Among portions of the main outer circumferential surface 263A, at least the stepped portion-side outer circumferential surface 263AG adjacent to the fourth stepped portion 295 is inclined radially outward in the first direction D1. The clutch center 240 is configured to rotate in the direction from the center-side assist cam portion 61 toward the center-side body 63 (i.e., in the first circumferential direction S1). Therefore, the clutch oil flowing on the main outer circumferential surface 263A, for example, flows along the fourth stepped portion 295, and thus flows to the sub outer circumferential surface 261A. The center-side assist cam portion 61 including the sub outer circumferential surface 261A includes the center-side assist cam surface 60A. Therefore, the clutch oil flowing on the sub outer circumferential surface 261A is supplied to the center-side assist cam surface 60A. The sub outer circumferential surface 261A and the stepped portion-side outer circumferential surface 263AG are inclined in opposite directions to each other with respect to the axial direction of the output shaft 15. Therefore, the height of the fourth stepped portion 295 is made higher, and thus the amount of the clutch oil accumulated on the sub outer circumferential surface 261A, that is, the amount of the clutch oil supplied to the center-side assist cam surface 60A is increased. In this manner, the clutch oil is effectively supplied to the center-side assist cam surface 60A, and the clutch oil is also effectively supplied to the pressure-side assist cam surface 90A through the center-side assist cam surface 60A.

With the clutch device 210 according to this preferred embodiment, as seen in the axial direction of the output shaft 15, the pressure-side cam holes 243H each include the first portion 243HA having the first length L9, in the circumferential direction, from one of two ends thereof in the circumferential direction S to the sub outer circumferential surface 261A, and the second portion 243HB located radially outward of the first portion 243HA and having the second length L10, in the circumferential direction, from the one end thereof to the other end thereof in the circumferential direction S. The second length L10 is longer than the first length L9. According to the above-described preferred embodiment, the pressure plate 270 and the clutch center 240 are easily assembled.

Another specific preferred embodiment of the technology disclosed herein may be as follows.

A clutch device to allow or block transfer of a rotation driving force of an input shaft to an output shaft includes a clutch center housed in a clutch housing holding a plurality of input-side rotating plates rotationally drivable by rotational driving of the input shaft, the clutch center being rotationally drivable together with the output shaft, and a pressure plate movable toward or away from the clutch center and rotatable with respect to the clutch center, the pressure plate holding a plurality of output-side rotating plates arranged alternately with the input-side rotating plates, the pressure plate being capable of pressing the input-side rotating plates and the output-side rotating plates, wherein the clutch center includes an output shaft holding portion coupled with the output shaft, a plurality of center-side cam portions located radially outward of the output shaft holding portion, the center-side cam portions each including a center-side assist cam surface to generate a force in such a direction as to cause the pressure plate to approach the clutch center, in order to increase a pressing force between the input-side rotating plates and the output-side rotating plates, when the clutch center rotates with respect to the pressure plate, and also including a center-side slipper cam surface separating the pressure plate from the clutch center, in order to decrease the pressing force between the input-side rotating plates and the output-side rotating plates, when the clutch center rotates with respect to the pressure plate, and a center-side cam hole located radially outward of the output shaft holding portion and between adjacent ones of the center-side cam portions while penetrating the clutch center, the center-side cam portions each include a center-side assist cam portion including the center-side assist cam surface, a center-side slipper cam portion including the center-side slipper cam surface, and a center-side body located between the center-side assist cam portion and the center-side slipper cam portion, the clutch center further includes a stepped portion between an outer circumferential surface of the output shaft holding portion and the center-side slipper cam portion and extending in an axial direction of the output shaft, the outer circumferential surface of the output shaft holding portion is located radially inward of the center-side slipper cam portion, and where regarding two of the plurality of center-side cam portions, a circumferential direction from one center-side cam portion toward the other center-side cam portion is defined as a first circumferential direction and a circumferential direction from the other center-side cam portion toward the one center-side cam portion is defined as a second circumferential direction, the clutch center is rotatable in the first circumferential direction from the center-side assist cam surface toward the center-side slipper cam surface of each of the center-side cam portions, and as seen in the axial direction of the output shaft, the stepped portion is adjacent to a radially innermost portion of an edge, on the side of the second circumferential direction, of the center-side cam hole. Some preferred embodiments of the present disclosure have been described. The above-described preferred embodiments are merely examples, and the present disclosure may be carried out in any of various other forms.

In the second preferred embodiment, the clutch center 240 does not hold the output-side rotating plates 22. The present disclosure is not limited to this. The clutch center 240 may include center-side fitting teeth, similar to the pressure-side fitting teeth 77 capable of holding the output-side rotating plates 22 as described in first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or block transfer of a rotation driving force of an input shaft to an output shaft, the clutch device comprising:
   a clutch center housed in a clutch housing holding a plurality of input-side rotating plates rotationally drivable by rotational driving of the input shaft, the clutch center holding a plurality of output-side rotating plates alternately arranged with the input-side rotating plates, the clutch center being rotationally drivable together with the output shaft; and
   a pressure plate movable toward or away from the clutch center and rotatable with respect to the clutch center to press the input-side rotating plates and the output-side rotating plates; wherein
   the pressure plate includes:
      a plurality of pressure-side cam portions each including a pressure-side assist cam surface to generate a force in such a direction as to cause the pressure plate to approach the clutch center, to increase a pressing force between the input-side rotating plates and the output-side rotating plates, when the pressure plate rotates with respect to the clutch center;
      a cylindrical portion housing a distal end of the output shaft to receive clutch oil flowing out of the output shaft; and
      a pressure-side cam hole located radially outward of the cylindrical portion and between adjacent ones of the pressure-side cam portions while penetrating the pressure plate;
   the pressure-side cam portions each include:
      a pressure-side assist cam portion including the pressure-side assist cam surface;
      a pressure-side slipper cam portion including a pressure-side slipper cam surface separating the pressure plate from the clutch center to decrease the pressing force between the input-side rotating plates and the output-side rotating plates;
      a pressure-side body adjacent to the pressure-side assist cam portion and located ahead of the pressure-side assist cam portion in a direction opposite to a rotation direction of the pressure plate;
      a first stepped portion between a main outer circumferential surface of the pressure-side body and a sub outer circumferential surface of the pressure-side assist cam portion and extending in an axial direction of the output shaft; and
      a second stepped portion between an outer circumferential surface of the cylindrical portion and the pressure-side slipper cam portion and extending in the axial direction of the output shaft;
   the sub outer circumferential surface is located radially inward of the main outer circumferential surface;
   the pressure-side slipper cam surface is located to oppose the pressure-side assist cam surface with the pressure-side body being located therebetween;
   the outer circumferential surface of the cylindrical portion is located radially inward of the pressure-side slipper cam portion;
   regarding two of the plurality of pressure-side cam portions, a circumferential direction from one pressure-side cam portion toward the other pressure-side cam portion is defined as a first circumferential direction and a circumferential direction from the other pressure-side cam portion toward the one pressure-side cam portion is defined as a second circumferential direction, the pressure plate is rotatable in the first circumferential direction from the pressure-side slipper cam surface toward the pressure-side assist cam surface of each of the pressure-side cam portions; and
   as seen in the axial direction of the output shaft, the second stepped portion is adjacent to a radially innermost portion of an edge, on the side of the first circumferential direction, of the pressure-side cam hole.

2. A clutch device to allow or block transfer of a rotation driving force of an input shaft to an output shaft, the clutch device comprising:
   a clutch center housed in a clutch housing holding a plurality of input-side rotating plates rotationally drivable by rotational driving of the input shaft, the clutch center holding a plurality of output-side rotating plates alternately arranged with the input-side rotating plates, the clutch center being rotationally drivable together with the output shaft; and a pressure plate movable toward or away from the clutch center and rotatable with respect to the clutch center to press the input-side rotating plates and the output-side rotating plates; wherein the pressure plate includes:

a cylindrical portion housing a distal end of the output shaft to receive clutch oil flowing out of the output shaft;

a plurality of pressure-side cam portions located radially outward of the cylindrical portion, the pressure-side cam portions each including a pressure-side assist cam surface to generate a force in such a direction as to cause the pressure plate to approach the clutch center, to increase a pressing force between the input-side rotating plates and the output-side rotating plates, when the pressure plate rotates with respect to the clutch center, and also including a pressure-side slipper cam surface separating the pressure plate from the clutch center, to decrease the pressing force between the input-side rotating plates and the output-side rotating plates, when the pressure plate rotates with respect to the clutch center; and a pressure-side cam hole located radially outward of the cylindrical portion and between adjacent ones of the pressure-side cam portions while penetrating the pressure plate;

the pressure-side cam portions each include:

a pressure-side assist cam portion including the pressure-side assist cam surface;

a pressure-side slipper cam portion including the pressure-side slipper cam surface; and a pressure-side body located between the pressure-side assist cam portion and the pressure-side slipper cam portion;

the pressure plate further includes a stepped portion between an outer circumferential surface of the cylindrical portion and the pressure-side slipper cam portion and extending in an axial direction of the output shaft;

the outer circumferential surface of the cylindrical portion is located radially inward of the pressure-side slipper cam portion;

regarding two of the plurality of pressure-side cam portions, a circumferential direction from one pressure-side cam portion toward the other pressure-side cam portion is defined as a first circumferential direction and a circumferential direction from the other pressure-side cam portion toward the one pressure-side cam portion is defined as a second circumferential direction, the pressure plate is rotatable in the first circumferential direction from the pressure-side slipper cam surface toward the pressure-side assist cam surface of each of the pressure-side cam portions; and as seen in the axial direction of the output shaft, the stepped portion is adjacent to a radially innermost portion of an edge, on the side of the first circumferential direction, of the pressure-side cam hole.

3. A motorcycle, comprising the clutch device according to claim 1.

* * * * *